US008104554B2

(12) United States Patent
Graham

(10) Patent No.: US 8,104,554 B2
(45) Date of Patent: Jan. 31, 2012

(54) DEVICE FOR TRANSPORTING A PHYSICALLY IMPAIRED PERSON

(76) Inventor: Randall J. Graham, Ottawa, IL (US)

( * ) Notice: Subject to any disclaimer, the term of this patent is extended or adjusted under 35 U.S.C. 154(b) by 1055 days.

(21) Appl. No.: 11/703,465

(22) Filed: Feb. 7, 2007

(65) Prior Publication Data

US 2008/0185885 A1 Aug. 7, 2008

(51) Int. Cl.
*B60K 1/00* (2006.01)
*A61G 5/10* (2006.01)

(52) U.S. Cl. ..................... 180/65.1; 280/304.1; 180/907

(58) Field of Classification Search ................. 180/65.1, 180/907; 280/250.1, 304.1, 304.2, 647, 650, 280/657, 47.4, 47.41; 297/DIG. 4, DIG. 10; 5/86.1

See application file for complete search history.

(56) References Cited

U.S. PATENT DOCUMENTS 3,023,048 A * 2/1962 Barton .......................... 297/330
3,787,089 A * 1/1974 Wrethander .................. 297/118
4,141,094 A * 2/1979 Ferguson et al. ................ 5/85.1
4,809,804 A * 3/1989 Houston et al. ............ 180/65.51
4,995,628 A * 2/1991 Orpwood et al. .......... 280/304.1
5,096,008 A * 3/1992 Mankowski ................... 180/6.5
5,366,036 A * 11/1994 Perry ........................... 180/65.1
5,524,303 A * 6/1996 Palmer et al. .............. 5/81.1 RP
5,556,121 A * 9/1996 Pillot ......................... 280/304.1
5,772,226 A * 6/1998 Bobichon .................. 280/250.1
6,152,478 A * 11/2000 Hung ............................ 280/650
6,412,801 B1 * 7/2002 Izuchukwu et al. ....... 280/250.1
6,443,252 B1 * 9/2002 Andes .......................... 180/65.1
6,601,869 B2 * 8/2003 Porcheron ..................... 280/648

* cited by examiner

*Primary Examiner* — J. Allen Shriver, II
*Assistant Examiner* — Bridget Avery
(74) *Attorney, Agent, or Firm* — Cherskov & Flaynik

(57) ABSTRACT

A device for transporting a physically impaired person includes a support frame member having electric motors secured thereto for operating rear drive wheels; a stabilizing plate for maintaining the position of the support frame member when lifting a physically impaired person, the stabilizing plate being positioned via an electric motor operating a linear actuator; and opposite lifting arms rotationally extended from the support frame member via electric motors operating linear actuators, the lifting arms ultimately placing a physically impaired person upon or removing the impaired person from an inclinable seat member secured to the support frame member.

23 Claims, 27 Drawing Sheets

DEVICE FOR TRANSPORTING A PHYSICALLY IMPAIRED PERSON

BACKGROUND OF THE INVENTION

1. Field of the Invention

The present invention relates generally to electrically powered devices for transporting a physically impaired person and, more particularly, to an electrically powered device that lifts a person proximate to the device, then disposes the person on the device, whereupon, the person is transported to a preselected location where the person is lifted from the device and disposed on a distal support structure.

2. Background of the Prior Art

Electrically powered transport devices such as wheelchairs are commonly used in and around medical facilities to transport physically impaired persons inside and outside the facility. Generally, an operator directs or "steers" the transport device from behind via "handle bars," or by a hand operated power switch that controls drive motors that impart rotary motion to a corresponding wheel to move the transport device in a selected direction.

The problem with prior art transport devices is that they do not "assist" the operator when the operator places the physically impaired person upon or removes the person from the transport device. More specifically, the operator must bend at the waist and lift the physically impaired person when placing the person upon or removing the person from the device. Severe back strain can and does occur to transport device operators, resulting in the operators suffering severe back pain for long periods of time, or in extreme cases, experiencing permanent back injury.

A need exists for an electrically powered transport device that lifts a physically impaired person, places the person upon the device, transports the person to a selected location, then lifts the person from the device and positions the person upon a support structure proximate to the device.

SUMMARY OF THE INVENTION

It is a principle object of the present invention to provide a device for transporting a physically impaired person. A feature of the device is that it is electrically powered and driven by a single stick switch "joy stick"; the joy stick being disposed upon a top portion of a control panel which is disposed upon a back portion of a support frame member of the device. Another feature of the device is a platform member secured to a bottom rear portion of the support frame member. An advantage of the device is that one operator can drive the device while standing on the platform member, thereby transporting the operator upon a rear portion of the device to promote faster and safer movement of the device through the hallways of a medical facility.

Another object of the present invention is to provide a device that lifts a physically impaired person from a distal position, then places the person upon a seat member of the device. A feature of the device is a pair of opposite lifting arms that rotational extend from a support frame member of the device to a position proximate to the physically impaired person. An advantage of the device is that the lifting arms lift the physically impaired person and places the person upon the seat member via push buttons manually operated by a person adjacent to the device. Another advantage of the device is that the lifting arms lift and remove the physically impaired person from a seat member of the device, then places the person upon a support frame or chair distal to the device. Yet another advantage of the device is that the person operating the push buttons does not have to lift the physically impaired person upon or from the device, thereby avoiding strain upon the back of the operator.

Yet another object of the present invention is to provide a device that maintains its position relative to a physically impaired person. A feature of the device is a stabilizing plate disposed adjacent to the lifting arms. An advantage of the device is that the stabilizing plate prevents the device from moving while the physically impaired person is placed upon or removed from the seat member of the device, thereby preventing further injury to the person. Another advantage of the device is that the person operating the lifting arms via the push buttons need focus only upon movement of the lifting arms when lifting the physically impaired person, thereby allowing the operator to be unconcerned as to movement of the support frame member or the wheels supporting the support frame member.

Still another object of the present invention is to provide a device that elevates a physically impaired person's posterior while disposed upon the seat member. A feature of the device is a pair of pivoting arms that elevate a rear portion of the seat member, while maintaining the elevation of a front portion of the seat member. An advantage of the device is that the seat member while in an inclined position, enables a physically impaired person capable of standing without operator assistance to lower their posterior upon or elevate their posterior from the inclined seat member, thereby avoiding back strain to the operator and reducing the time required for the operator to "load," transport and "unload" the physically impaired person upon and from the device.

Briefly, the invention provides a device for transporting a physically impaired person comprising drive means for promoting manually controlled movement of a support frame member of said device; means for stabilizing said support frame member when lifting a physically impaired person upon or removing a physically impaired person from a seat member disposed upon said support frame member; and means for lifting a physically impaired person distally disposed to said seat member, said lifting means ultimately disposing the physically impaired person upon said seat member, said lifting means being capable of removing the physically impaired person from said seat member, whereby an operator of said device is capable of elevating a physically impaired person from a seated position and disposing the person upon said seat member of said device, transporting the physically impaired person to a selected location, elevating the physically impaired person from said seat member, and disposing the person in a seated position upon a distal support structure.

The invention further provides a system for lifting and moving a person comprising means for controlling motors for moving a chair structure; means for lifting a person from a distal location and disposing the person upon said chair structure; means for lifting the person from said chair structure and disposing the person upon a distal support frame; and means for positioning a seat member disposed upon said chair structure.

The invention also provides a method for transporting a person, said method comprising the steps of lifting a person distal to a movable support structure via at least one lifting arm rotationally secured to said movable support structure; disposing the person on a seat member secured to said movable support structure; driving said movable support structure to a selected location; lifting the person from said movable support structure; and disposing the person upon a selected support frame distal to said movable support structure.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
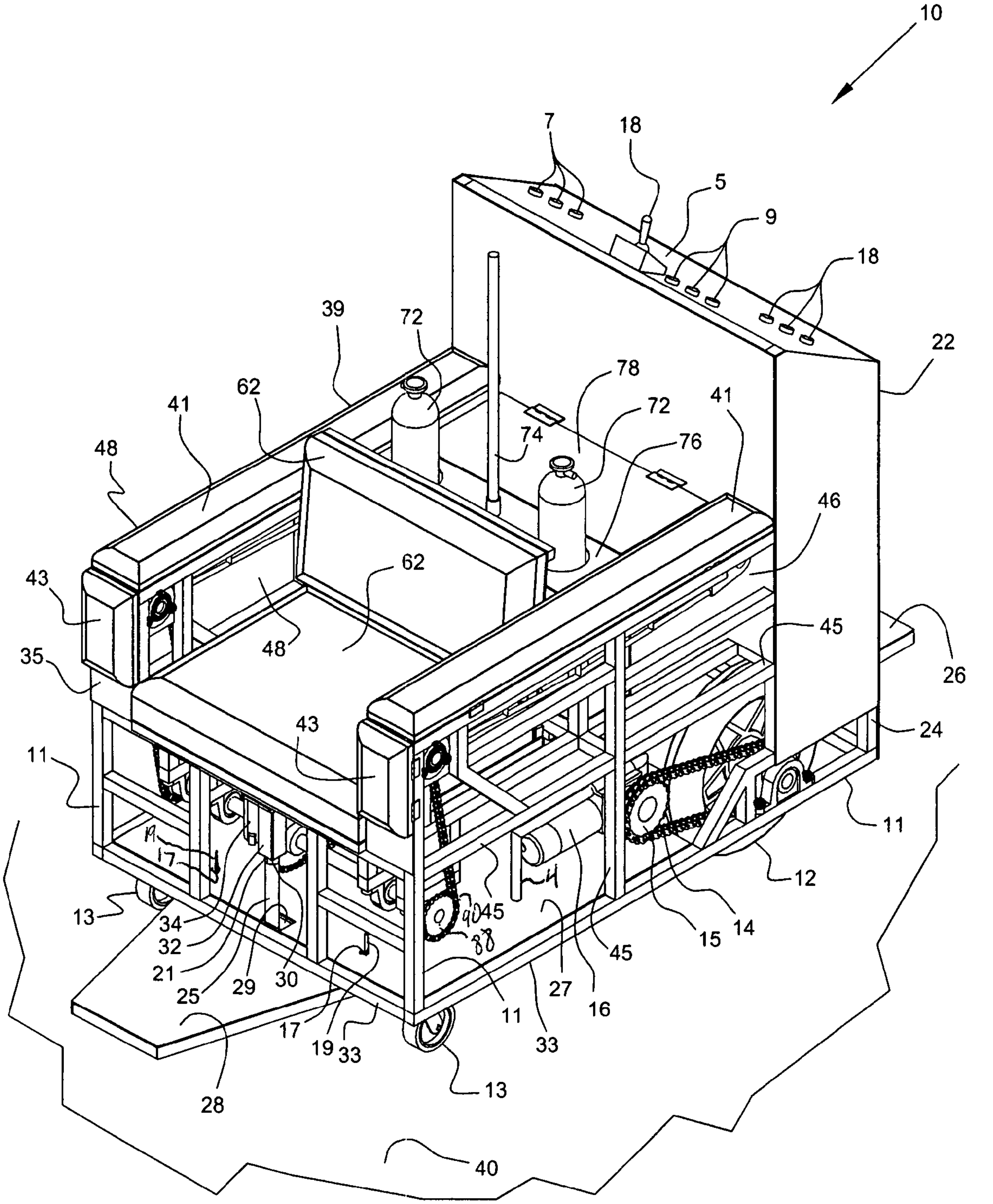
FIG. 1 is a front perspective view of a device for transporting a physically impaired person in accordance with the present invention, the device being depicted in a lifting position with a stabilizing member engaging a floor surface.
Figure 2:
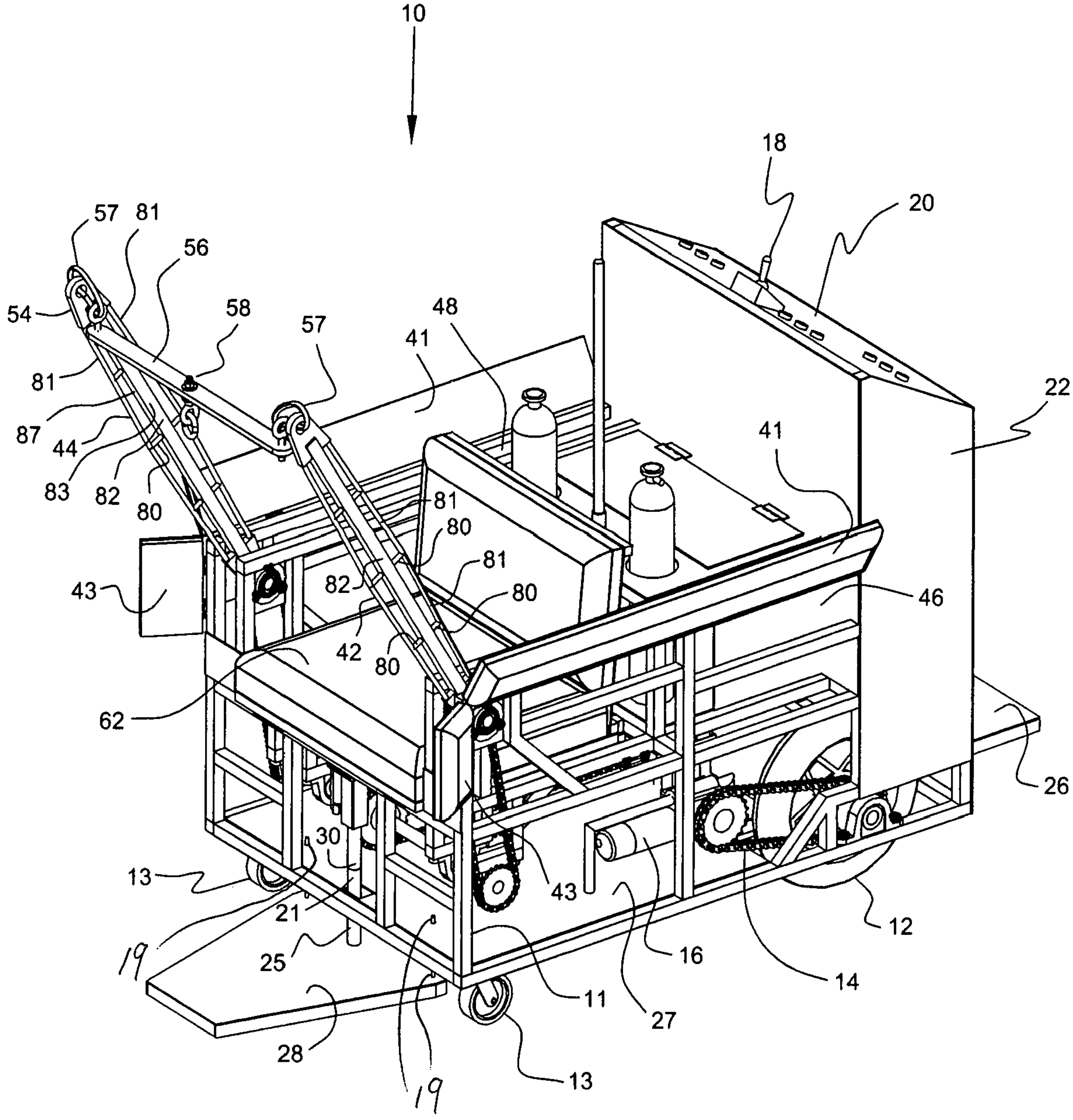
FIG. 2 is the front perspective view of FIG. 1, but with lifting arms extended and a lifting bar connected to outer ends of the lifting arms in accordance with the present invention.
Figure 3:
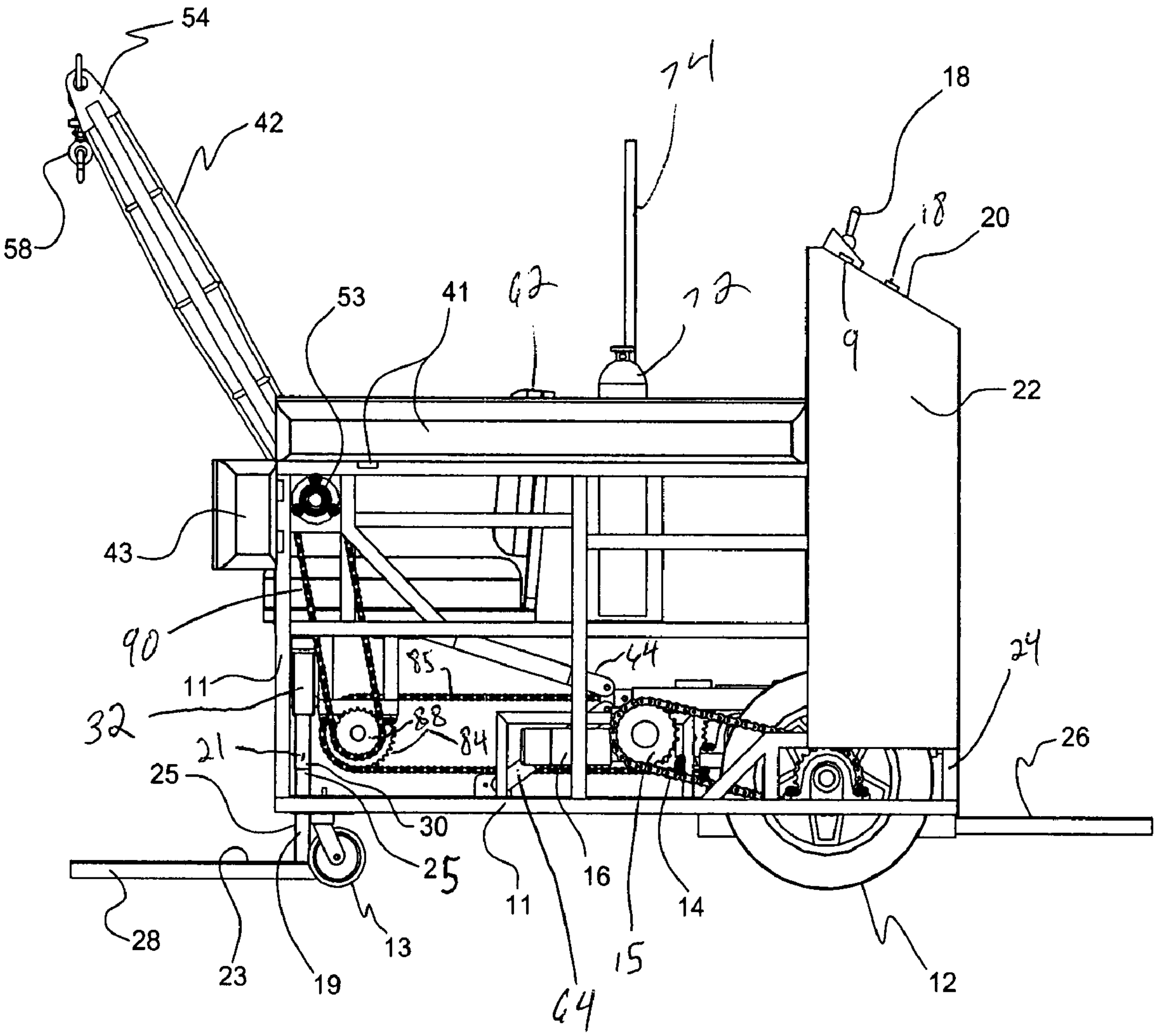
FIG. 3 is a right side elevation view of the device of FIG. 2.

Referring now to FIGS. 1-9, a device for transporting a physically impaired person in accordance with the present invention is denoted by numeral 10. The device 10 includes a support frame member 11 having opposite pivoting front wheels or castors 13, and opposite, solid rubber rear drive wheels 12 operated by chains 14 that engage and receive rotary motion from drive sprockets 15 that are secured to and rotated by battery (not depicted) powered twenty-four volt, one horsepower D.C. motors 16. The motors 16 are manually controlled via a movable stick or hand switch 18 disposed upon a top portion 20 of a control panel 22 and at a rear portion 24 of the support frame member 11. The stick 18 includes positions that direct the device 10 forward, reverse, right and left via relays (not depicted) in the control panel 22; the relays being wired to the stick 18 and motors 16 to control rotation of the motors 16 via wiring schemes well known to those of ordinary skill in the art. The pivoting stick 18 is manually adjusted by a person standing on a platform member 26 which allows the person operating the device 10 to ride upon the device 10 while transporting a physically impaired person. Alternatively, the stick 18 may be disposed upon a front portion of the support frame member 11, whereby the physically impaired person is allowed to operate the device 10. A metal plate 27 covers the bottom of the support frame member 11 to provide a base for the attachment of predetermined metal support channels, including channels 4 that support and align the motors 16 with the rear drive wheels 12. The metal plate 27 includes a front aperture 29 and two rear apertures 31 to allow corresponding components to extend through the metal plate 27.

Referring to FIGS. 10-23, the support frame member 11 is configured and dimensioned to promote the transporting of one physically impaired person by the device 10 through typical doorways and hallways of hospitals, nursing homes and similar health facilities. Further, the overall size of the device 10 allows at least two devices 10 to pass each other in a hallway of a medical facility. The support frame member 11 is fabricated from metal channels or tubes 33 that are welded together to ultimately form a "chair" configuration at a front portion 35, a storage area (for batteries under cover 78 and oxygen tanks 72) at a mid-portion 39, and the control panel 22 at the rear portion 24. The metal channels 33 are typically one inch square with one-eighth thick walls. For increased strength and stability, vertical and horizontal stabilizing channels 45 are included in the support frame member 11 at predetermined locations.

Referring to FIGS. 1-9, and 16-19, the device 10 further includes a solid metal, relatively heavy, stabilizing plate 28 having a metal rod or pipe 25 secured thereto via a lower end welded perpendicularly to a base edge portion 23 of the stabilizing plate 28. The pipe 25 includes an upper end with an aperture that removably receives a pin 21 that ultimately secures the pipe 25 to an extendible portion 30 of a 250 pound linear actuator 32 with a four inch stroke, which is forcibly extended and retracted by the rotation of a twelve volt D.C. motor 34, thereby allowing the linear actuator 32 to forcibly urge the stabilizing plate 28 against a floor 40 and stabilize the device 10 when lifting a physically impaired person from or disposing the person upon the device 10. The motor 34 is controlled by three push button switches 7 (labeled "extend-off-retract") and cooperating relays (not depicted) disposed in the control panel 22. The switches 7 and relays are wired to the motor 34 to control the rotational direction of the motor 34; the control wiring scheme being well known to those of ordinary skill in the art.

The pipe 25 has a longitudinal dimension that facilitates the disposing of the plate 28 upon a ground or floor surface 40 when the linear actuator 32 extends the extendible portion 30 a predetermined distance via push buttons 7. The pipe 25 has a wall thickness sufficient to support the stabilizing plate 28 via the base edge portion 23 without deforming or otherwise "bending" while the linear actuator 32 is in a retracted position elevated above a ground or floor surface 40. The stabilizing plate 28 is configured in a substantially trapezoidal form with a predetermined surface area and thickness to provide a sufficient floor engagement mass that maintains the position of the device 10 while placing a person upon the device 10. The trapezoidal form reduces the likelihood of engagement between the plate 28 and walls, doorways or similar structures as the device 10 turns. The stabilizing plate 28 further includes guide bolts 19 welded or otherwise secured to the base edge portion 23 such that the pipe 25 is disposed substantially equidistant between the guide bolts 19. The guide bolts 19 ultimately insert through cooperating apertures 17 in the metal plate 27 to promote extension or retraction of the stabilizing plate 28 via the linear actuator 32. The apertures 17 are dimensioned to snugly receive the guide bolts 19, thereby minimizing horizontal movement of the guide bolts 19 and the relatively heavy stabilizing plate 28 while extending or retracting the stabilizing plate 28, which correspondingly prevents the stabilizing plate 28 from damaging the linear actuator 32 during operation. The linear actuator 32 is manufactured by Dayton Electric Manufacturing Company ("Dayton"), located at 5959 W. Howard St., Niles, Ill. 60714.

The linear actuator 32 is mechanically secured to a front horizontal bar or channel 36 which is reinforced via front corner posts 37 and front support frame channels 38, thereby enabling the front horizontal bar 36 to maintain the position of the linear actuator 32 and the stabilizing plate 28, irrespective of the force generated by the motor 34 when extending or retracting the extendible portion 30 to forcibly urge the stabilizing plate 28 to engage a floor 40, or to elevate the plate 28 to allow the device 10 to move. The stabilizing plate 28 maintains a selected position for the device 10 upon a floor 40 or substantially planar surface while a physically impaired person is set upon the device 10 or removed from the device 10. Although the preferred embodiment of the present invention includes a stabilizing plate 28 welded to the end portion of the pipe 25, adapting the plate 28 for sliding beneath the support frame member 11 for improved mobility of the device 10, is readily accomplished by detachably securing the end portion of the pipe 25 to the plate 28 via nut and bolts or similar means well known to those or ordinary skill. The plate 28 would ultimately be detached from the pipe 25, then slid and supported under the support frame member 11 via angle iron or similar support channels.

Referring to FIGS. 1-5, 10-16, and 25-28, the device 10 further includes opposite first and second lifting arms 42 and 44 disposed (when in a retracted position) in cooperating first and second side portions 46 and 48 of the support frame member 11. The first and second lifting arms 42 and 44 are encased in the cooperatively dimensioned side portions 46 and 48 via padded and hinged, top arm rests 41; and padded and hinged side covers 43. When the lifting arms 42 and 44 are to be extended from the first and second side portions 46 and 48, the top arm rests 41 and side covers 43 are pivoted to reveal the lifting arms 42 and 44 within. The first and second lifting arms 42 and 44 are rotationally extended via bushing assemblies 53 supplied by Berry Bearing Co. in Rockdale, Ill., 60436. The bushing assemblies 53 are secured to first and second front portions 50 and 52 of respective first and second lifting arms 42 and 44; the first and second front portions 50 and 52 being cooperatively secured, via means well known to those of ordinary skill in the art, to top front portions of the support frame member 11. The first and second lifting arms 42 and 44 include outer ends 54 that are ultimately disposed proximate to a physically impaired person, thereby enabling a harness 60 removably secured to a lifting bar 56, which is removably secured to the outer ends 54, to receive and transport the physically impaired person. The rotary motion imparted upon the first and second lifting arms 42 and 44 is produced by first and second six hundred pound Dayton linear actuators 47 and 49 with twelve inch strokes, which are lineally extended and retracted by corresponding twenty-four volt D.C. motors 51. The rotational direction of the arm motors 51 are controlled by three push button switches 9 (labeled "extend-off-retract") and relays (not depicted) in the control panel 22. The switches 9 and relays are wired to the motors 51 via wiring schemes well known to those or ordinary skill in the art.

The lifting bar 56 is removably secured to the first and second outer ends 54 of the lifting arms 42 and 44 via detachable couplers 57. The lifting bar 56 includes a swivel 58 that is secured to a mid-portion of the lifting bar 56, the swivel 58 receives a lifting harness 60 which ultimately receives a physically impaired person. The harness 60 is disposed to enable the physically impaired person to be "inserted" into the harness 60 and lifted by the first and second lifting arms 42 and 44. The swivel 58 promotes the pivoting of the person in the lifting harness 60 from a position facing the device 10, to a position where the person's back is to the device 10. The first and second lifting arms 42 and 44 are then rotationally retracted via the linear actuators 47 and 49 until the person's posterior is lowered upon a seat member 62 disposed upon the support frame member 11. The physically impaired person is then transported by the device 10 to a selected location, whereupon, the first and second lifting arms 42 and 44 are again extended, thereby removing the person from the seat member 62 and disposing the person upon a distal chair or other support member so that the lifting harness 60 may be removed from the person.

Figure 4:
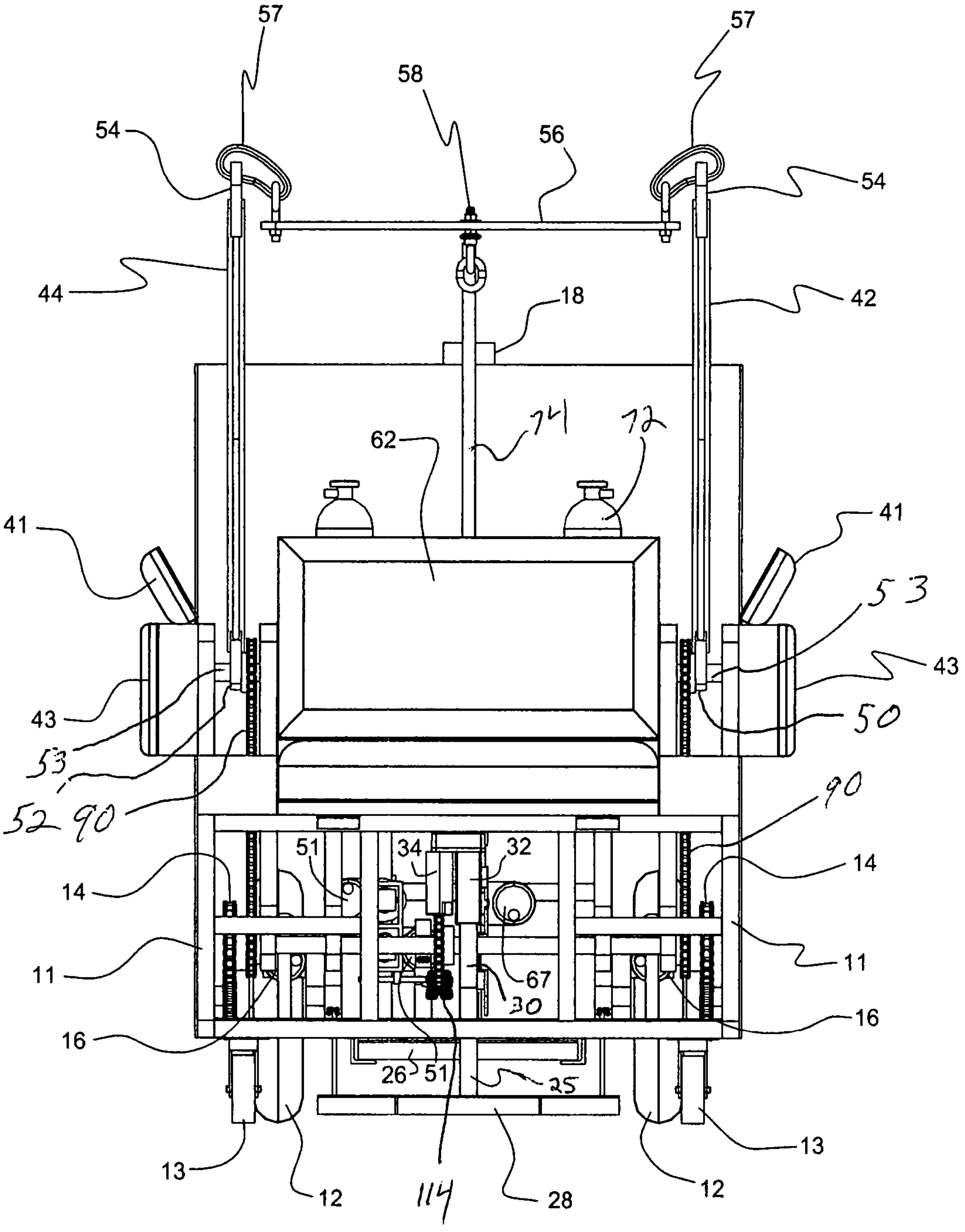
FIG. 4 is a rear elevation view of the device of FIG. 2.
Figure 5:
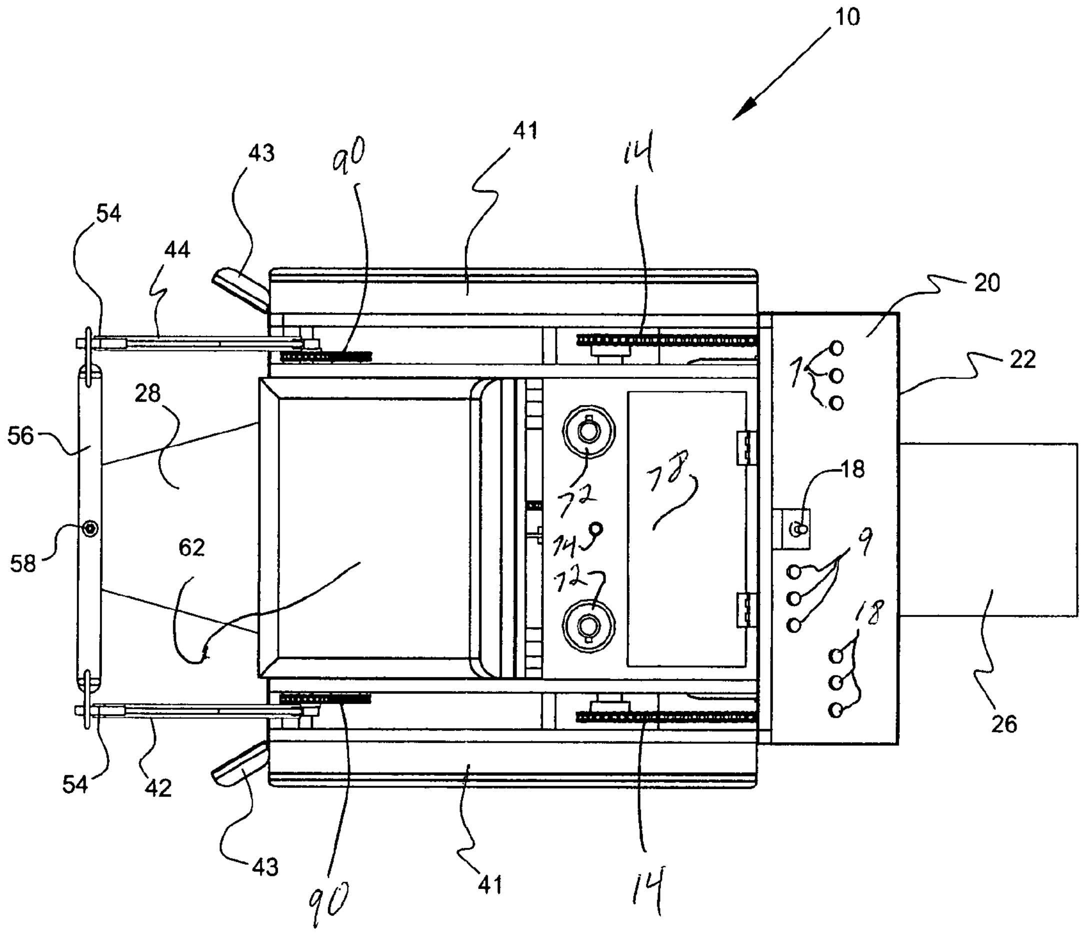
FIG. 5 is a top elevation view of the device of FIG. 2.
Figure 6:
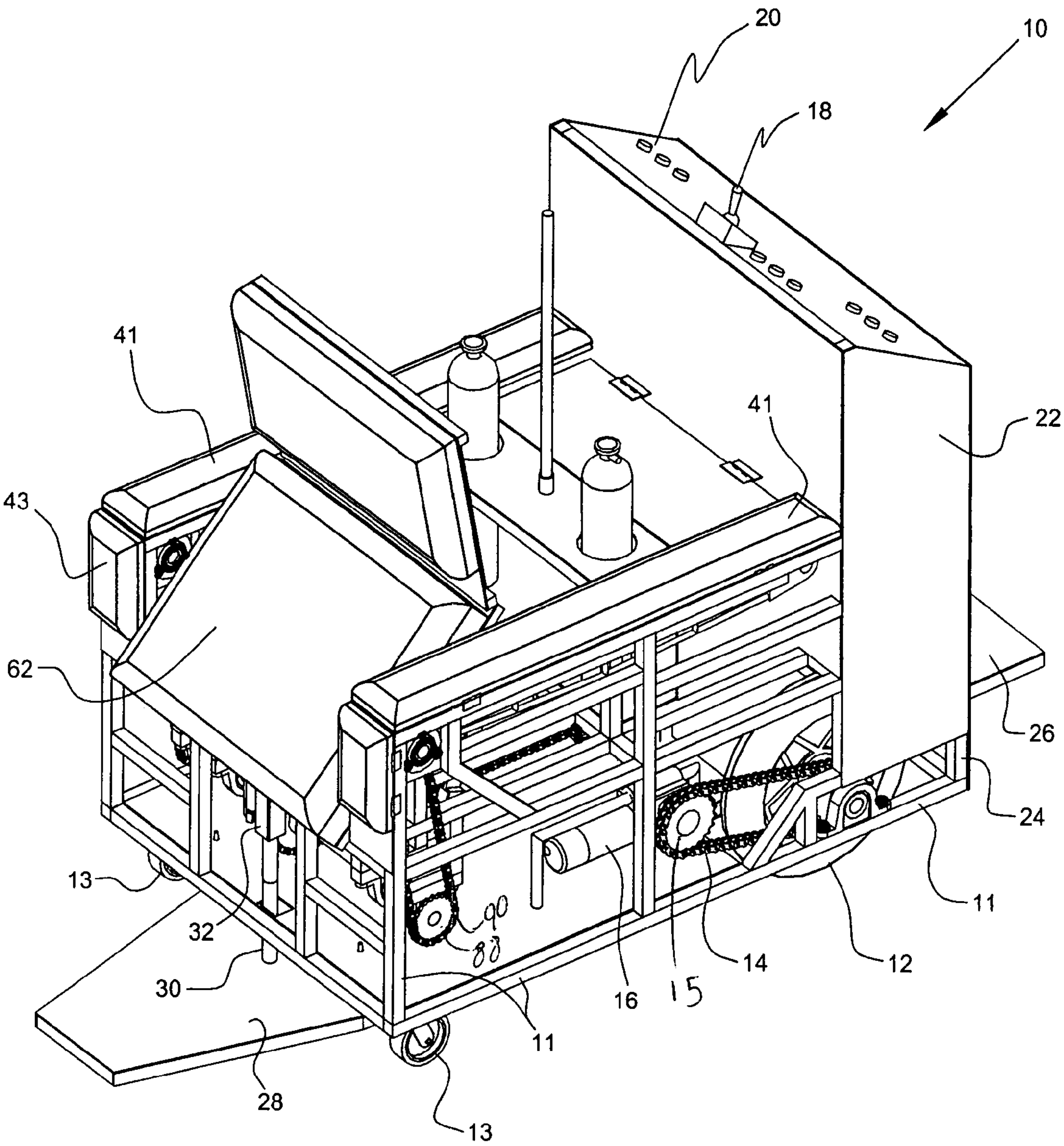
FIG. 6 is the front perspective view of FIG. 1, but with a seat member orientated to receive or to elevate a physically impaired person.
Figure 7:
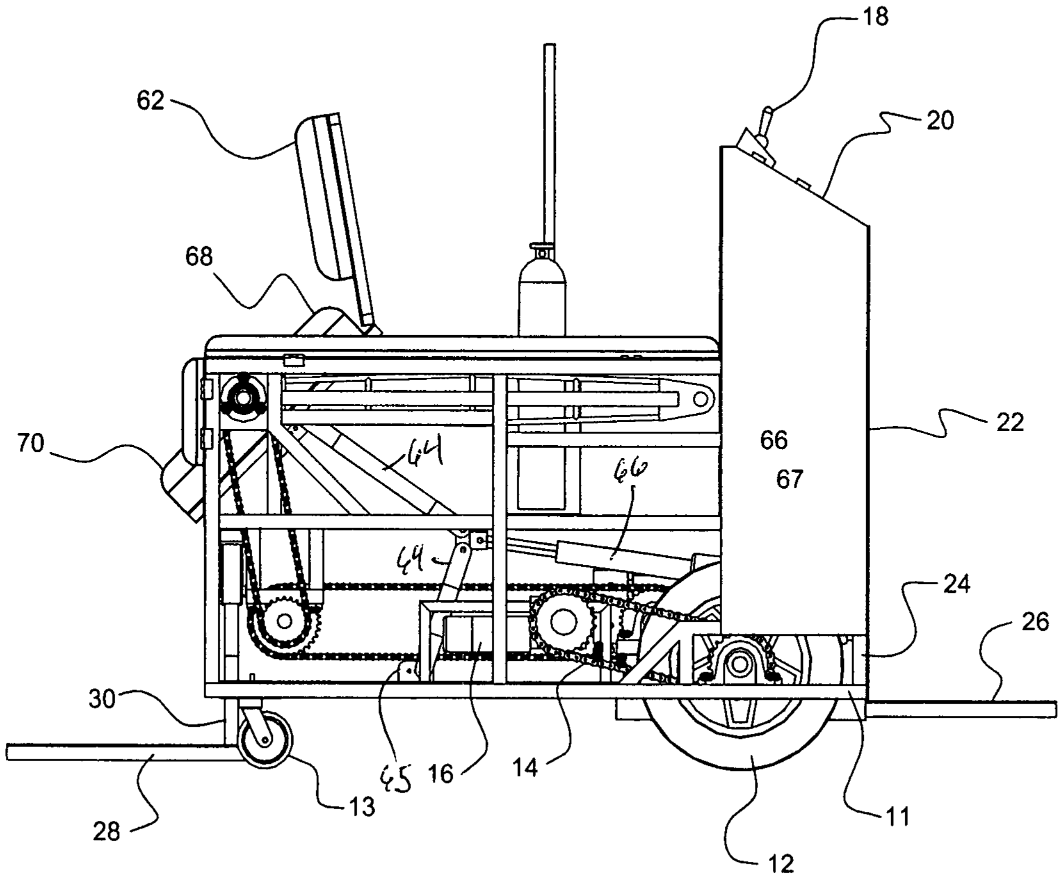
FIG. 7 is a right side elevation view of the device of FIG. 6.
Figure 8:
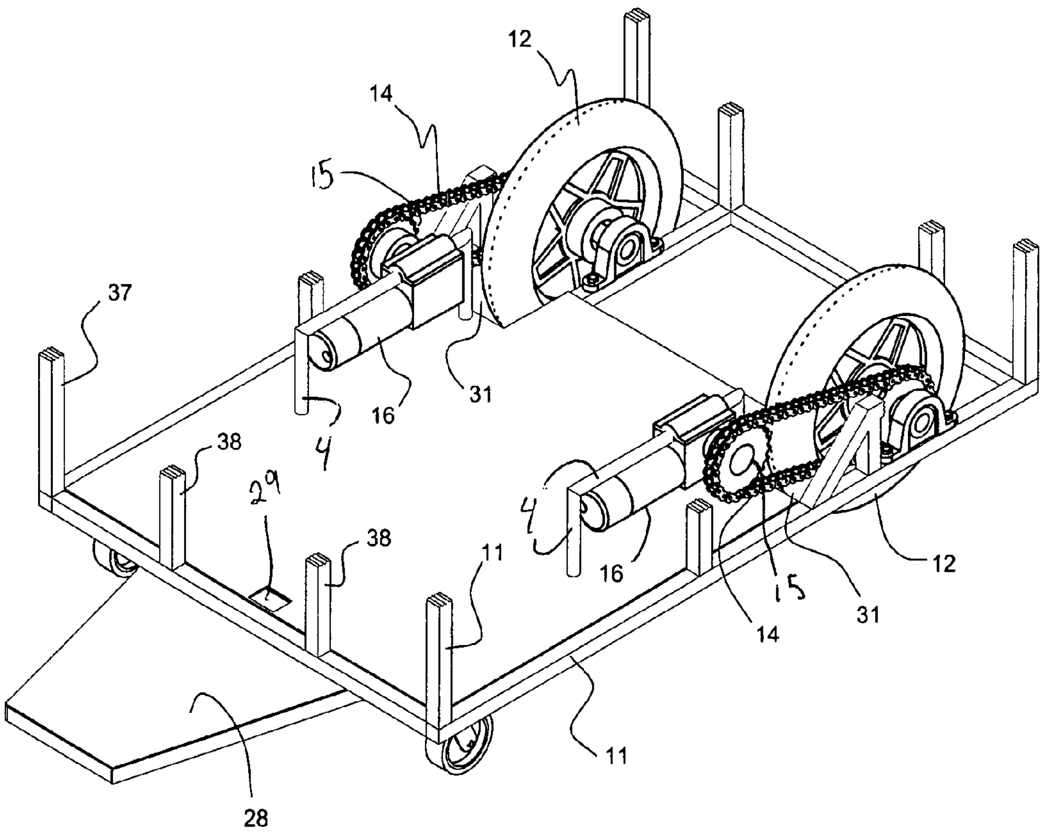
FIG. 8 is a front perspective view of the device of FIG. 1, but with a support frame member removed to reveal drive means for the device in accordance with the present invention.
Figure 9:
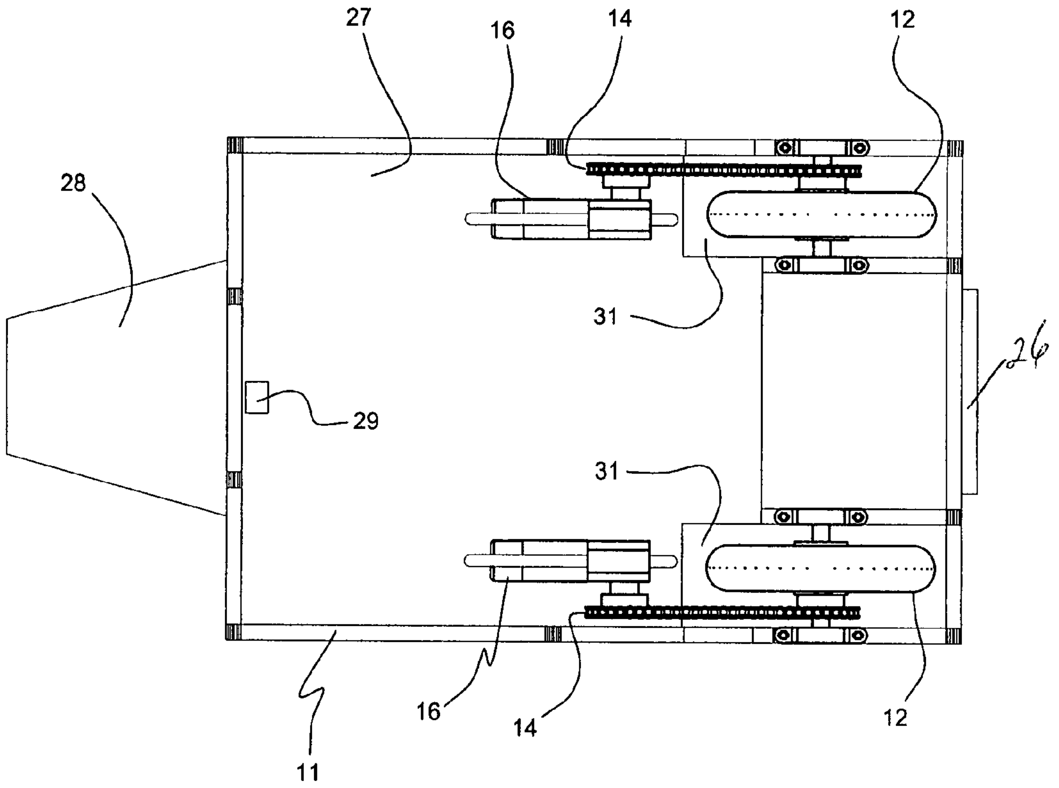
FIG. 9 is a top elevation view of the device of FIG. 8.
Figure 10:
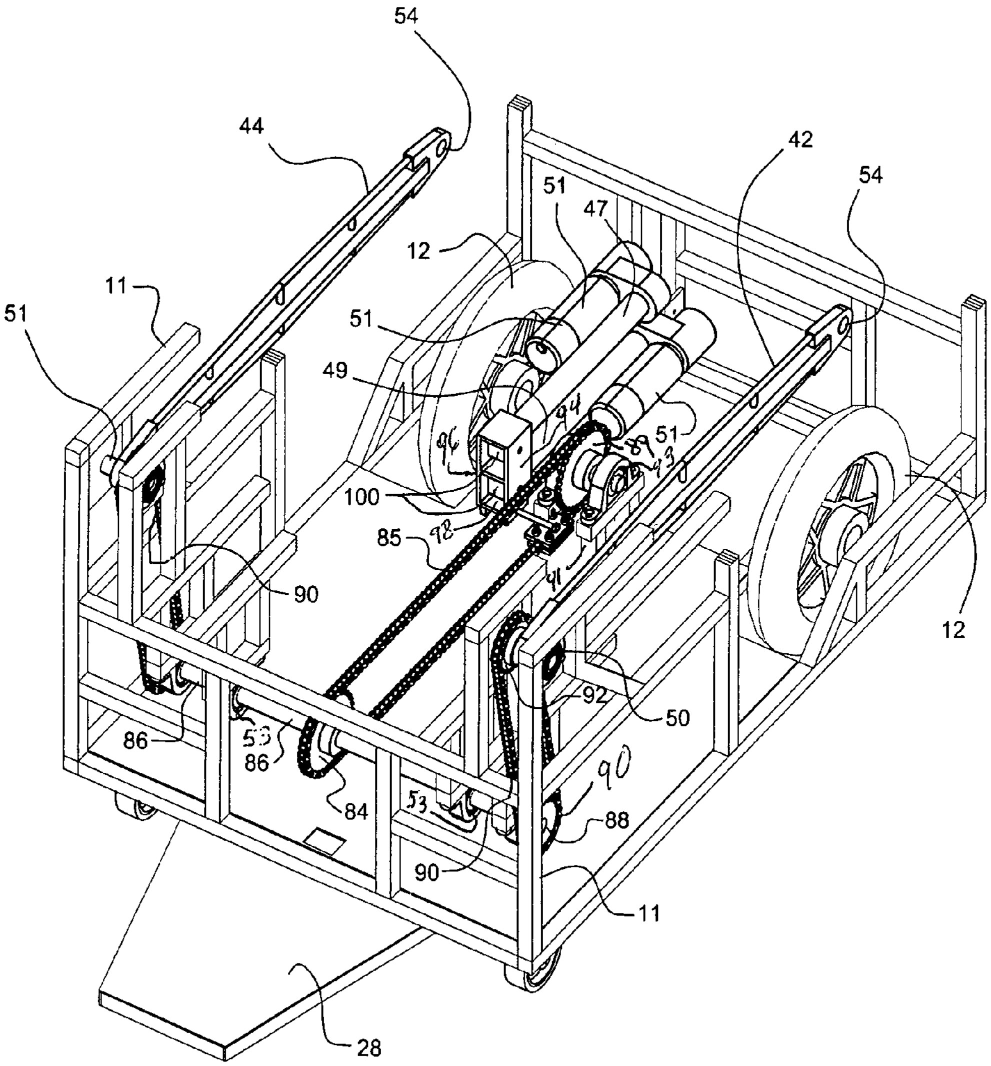
FIG. 10 is a front perspective view of the device of FIG. 1, but with the support frame member removed to reveal the drive means, the lifting arms retracted, and two cooperating linear actuators that rotationally extend the lifting arms in accordance with the present invention.
Figure 11:
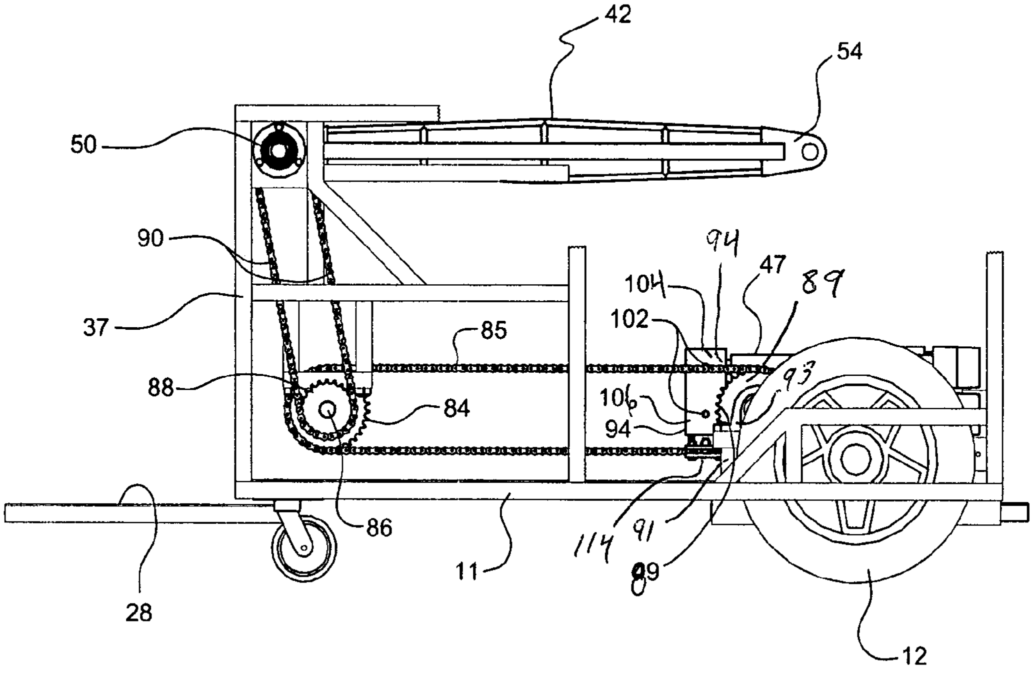
FIG. 11 is a right side elevation view of the device of FIG. 10.
Figure 12:
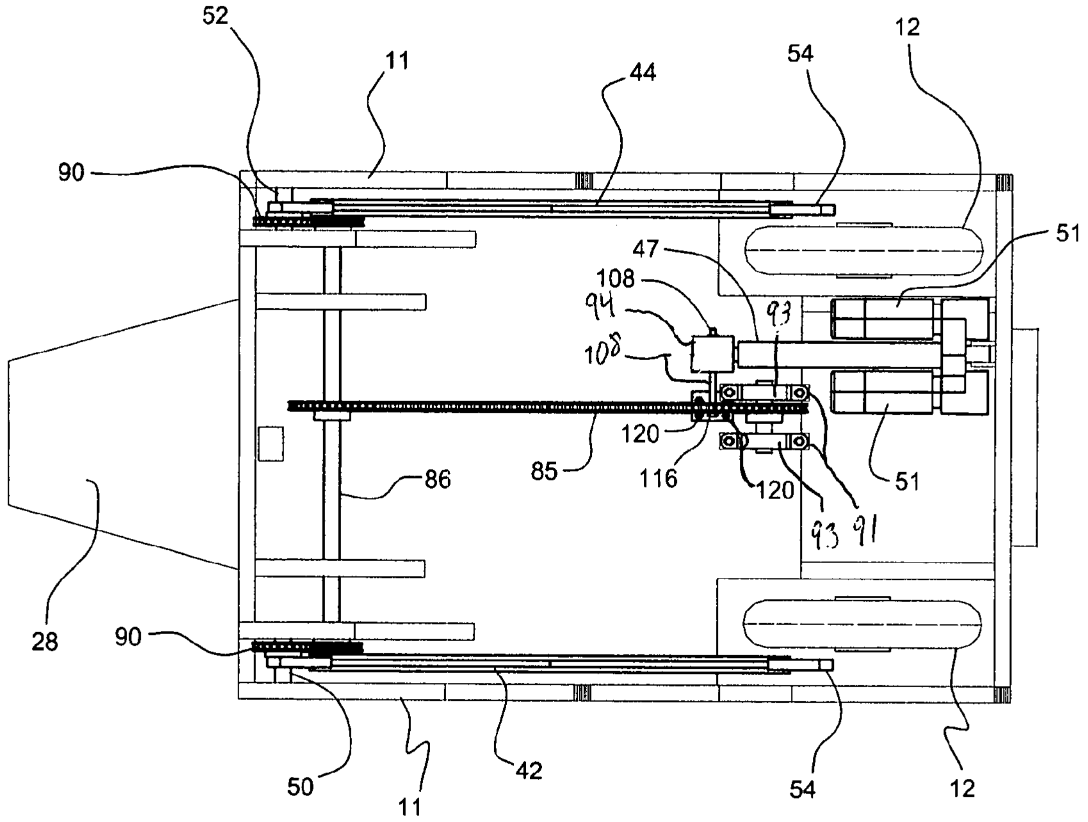
FIG. 12 is a top elevation view of the device of FIG. 10.
Figure 13:
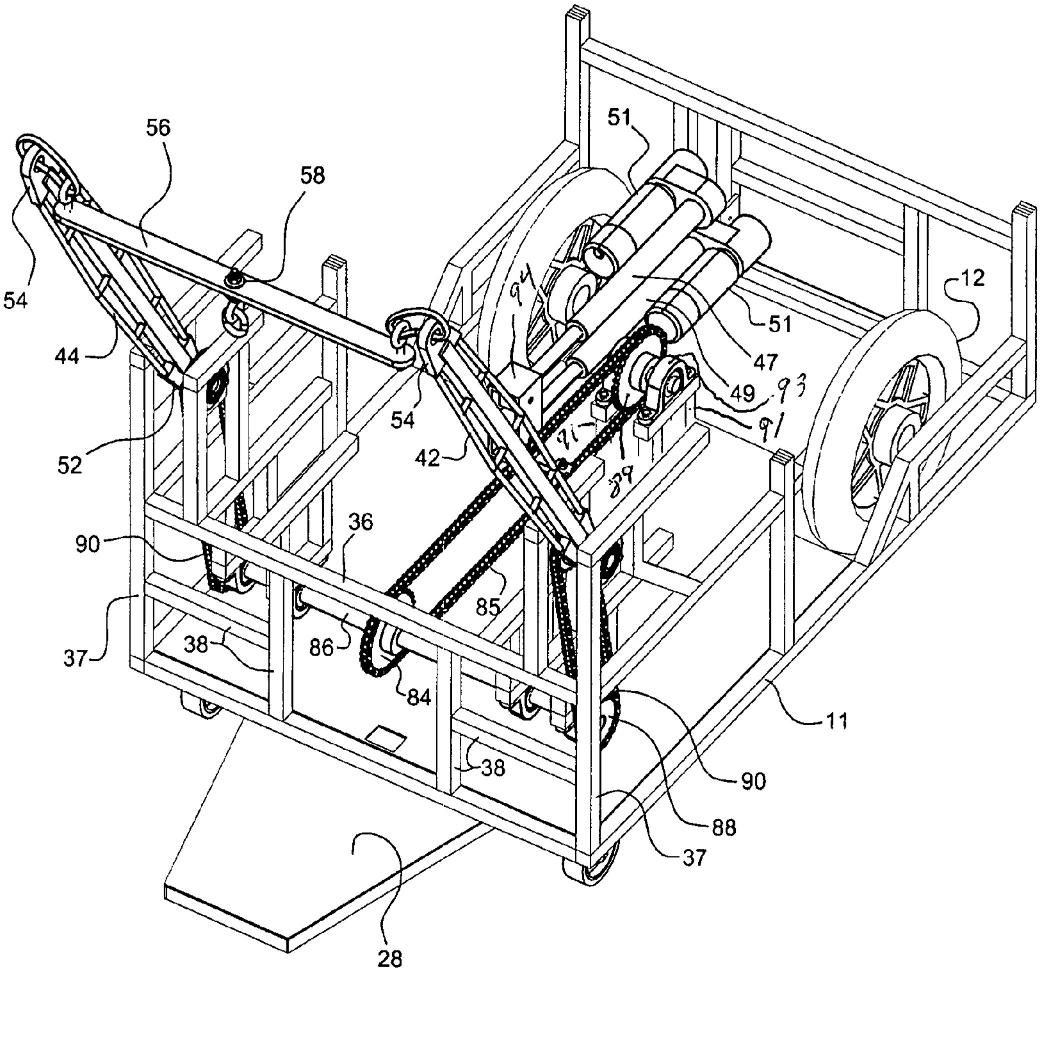
FIG. 13 is the front perspective view of FIG. 10, but with the lifting arms extended and with the lifting bar connected to the outer ends of the lifting arms in accordance with the present invention.
Figure 14:
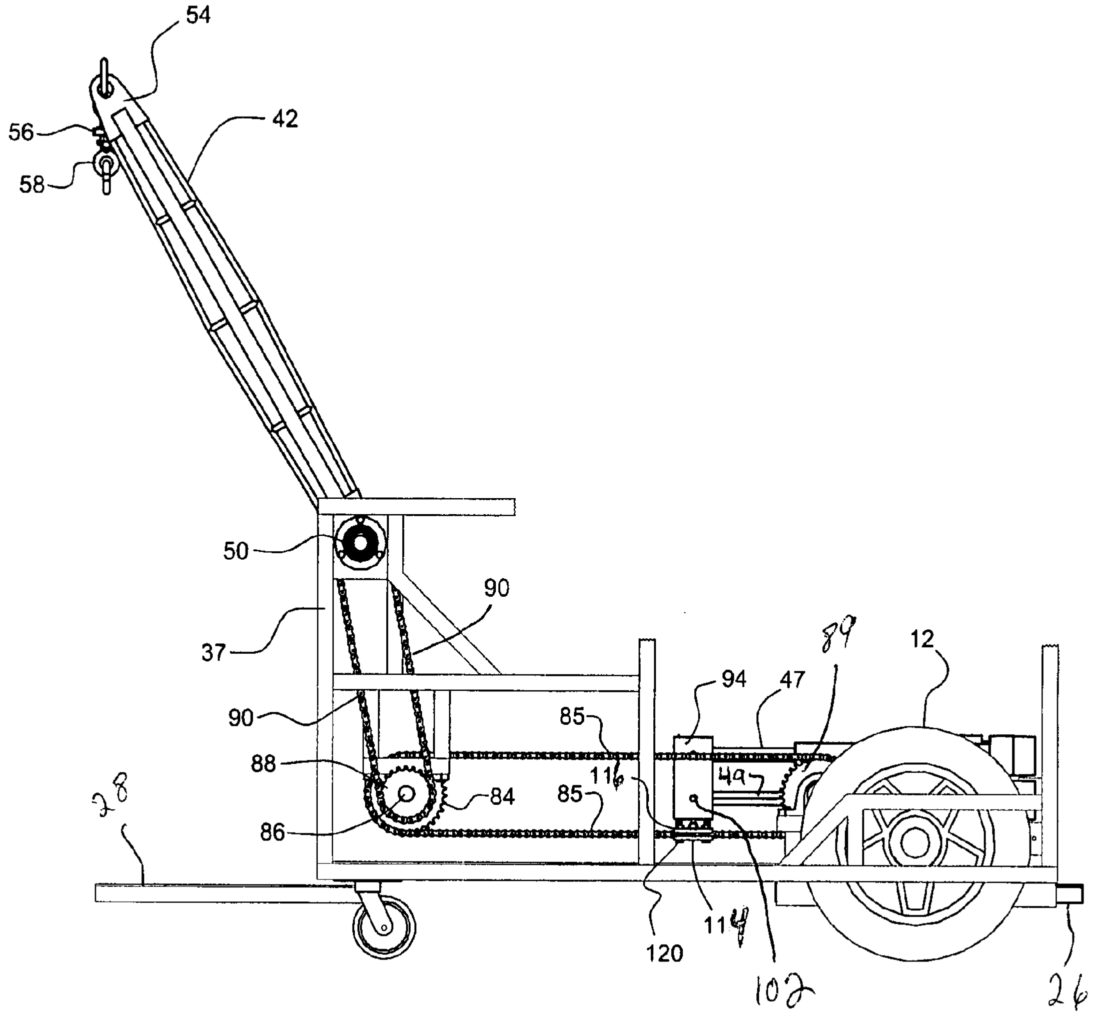
FIG. 14 is a right side elevation view of the device of FIG. 13.
Figure 15:
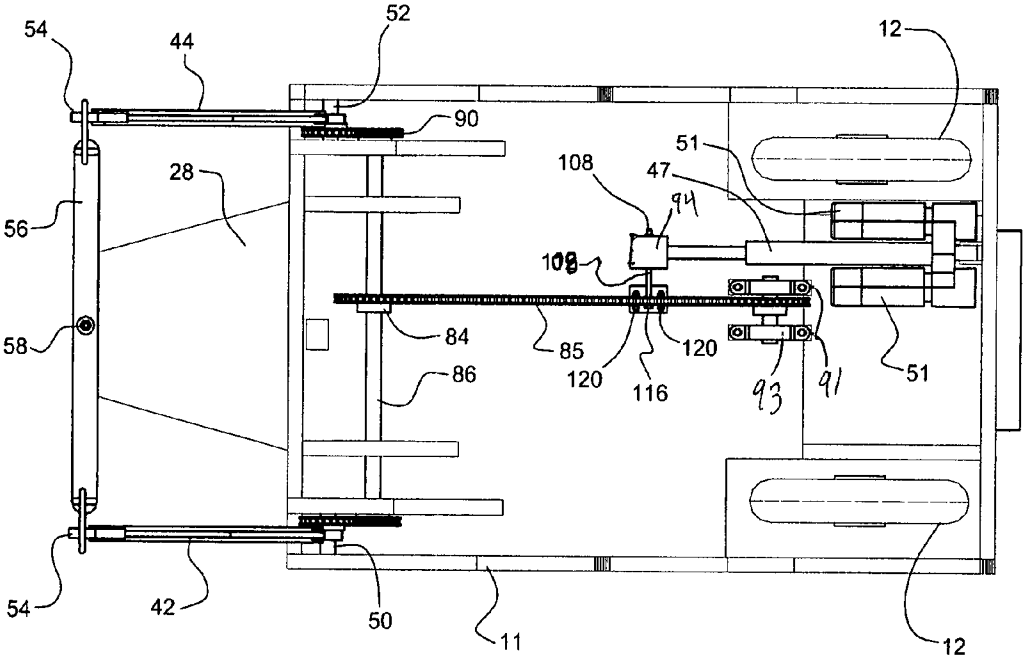
FIG. 15 is a top elevation view of the device of FIG. 13.
Figure 16:
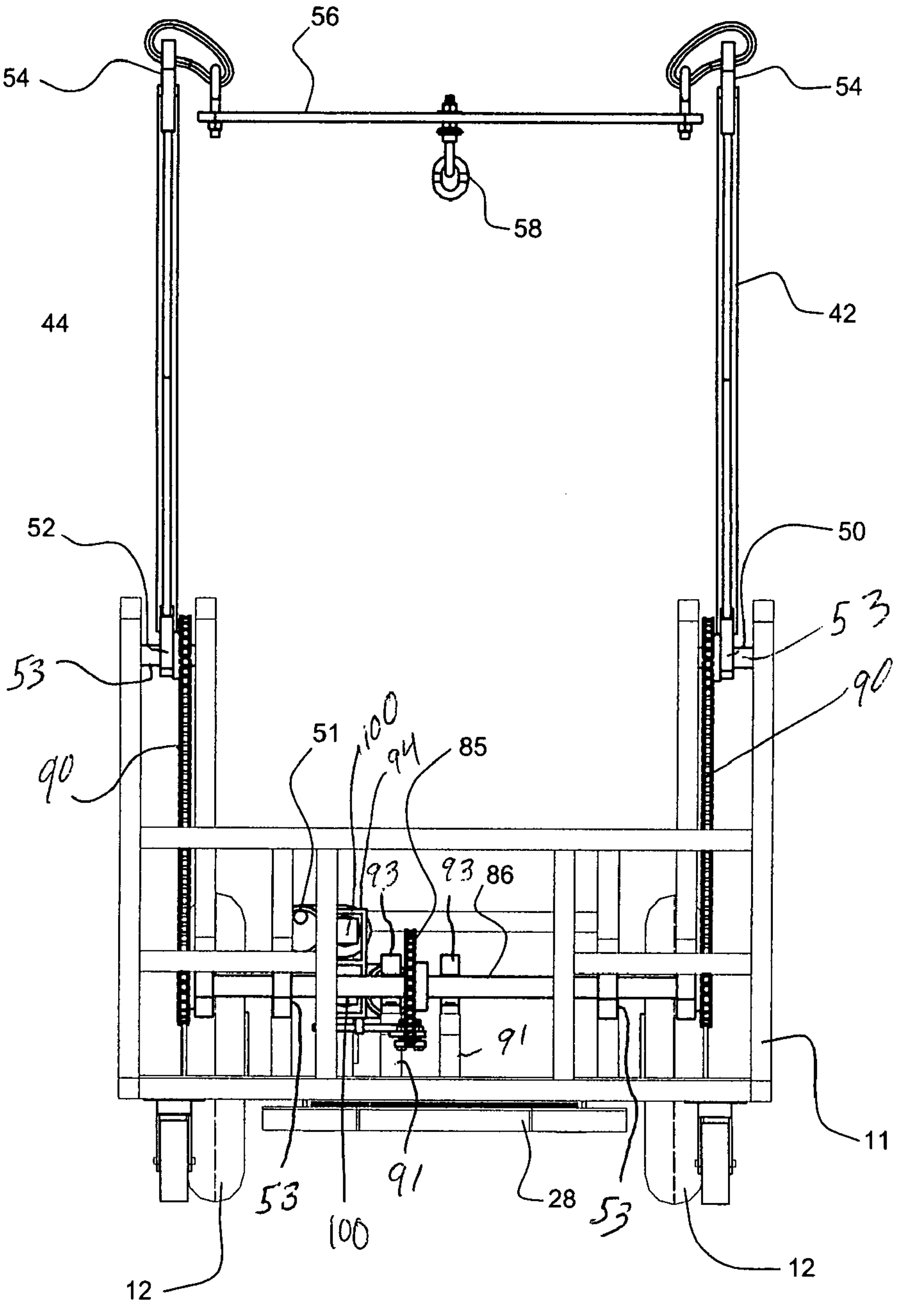
FIG. 16 is a front elevation view of the device of FIG. 13.
Figure 17:
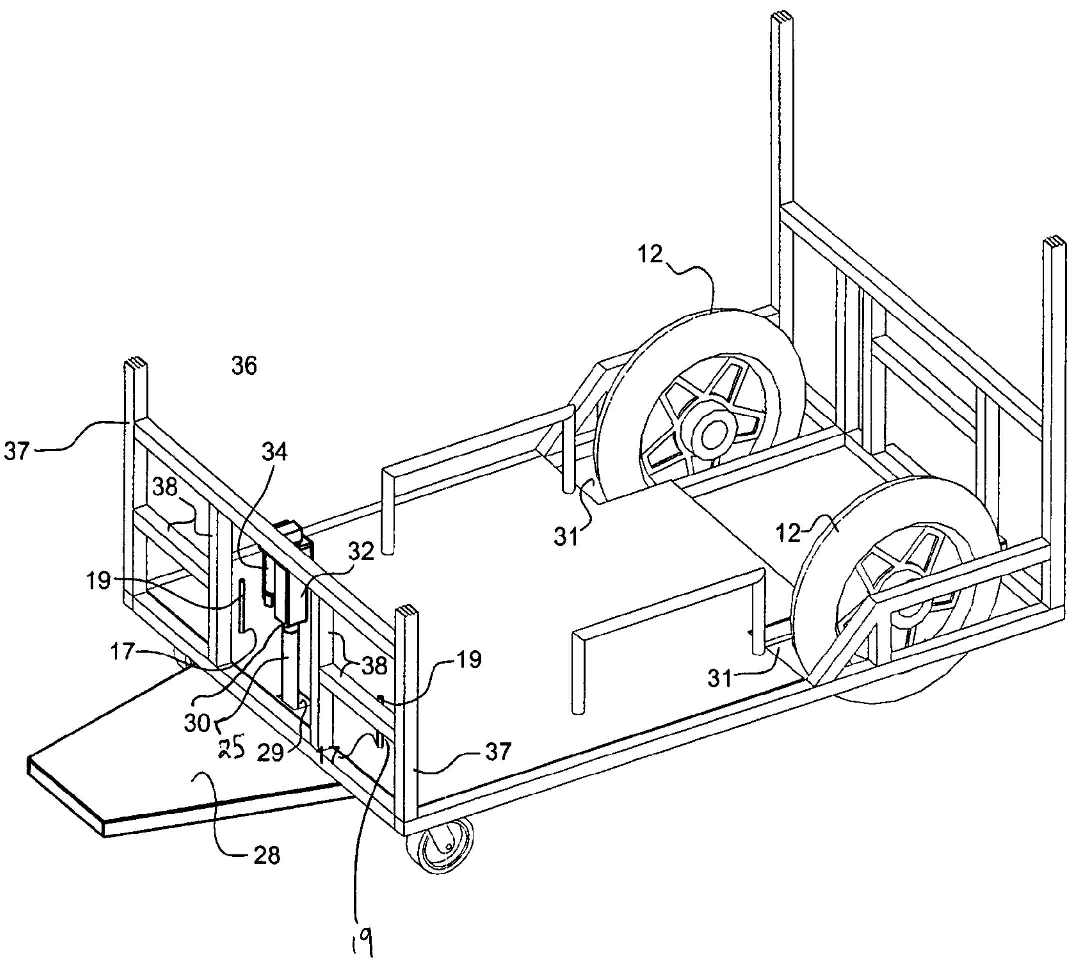
FIG. 17 is a front perspective view of the device of FIG. 1, but with the support frame member removed to reveal a linear actuator that forcibly extends the stabilizing member into engagement with the floor surface in accordance with the present invention.
Figure 18:
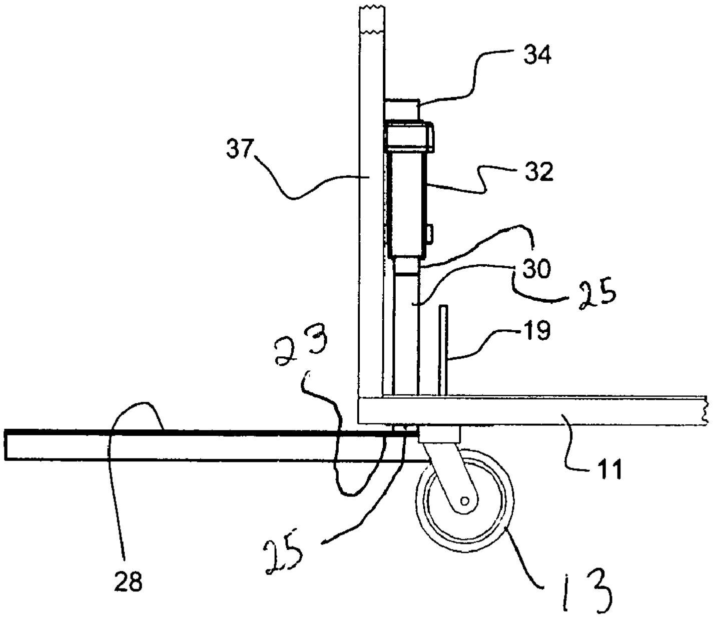
FIG. 18 is a right side elevation view of the linear actuator and stabilizing member of FIG. 17 in retracted positions in accordance with the present invention.
Figure 19:
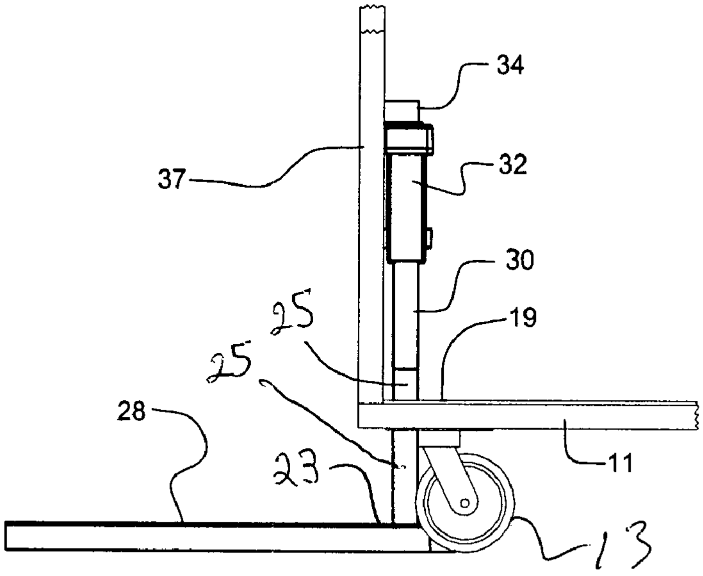
FIG. 19 is a right side elevation view of the linear actuator and stabilizing member of FIG. 17, but with the linear actuator and stabilizing member in extended positions in accordance with the present invention.
Figure 20:
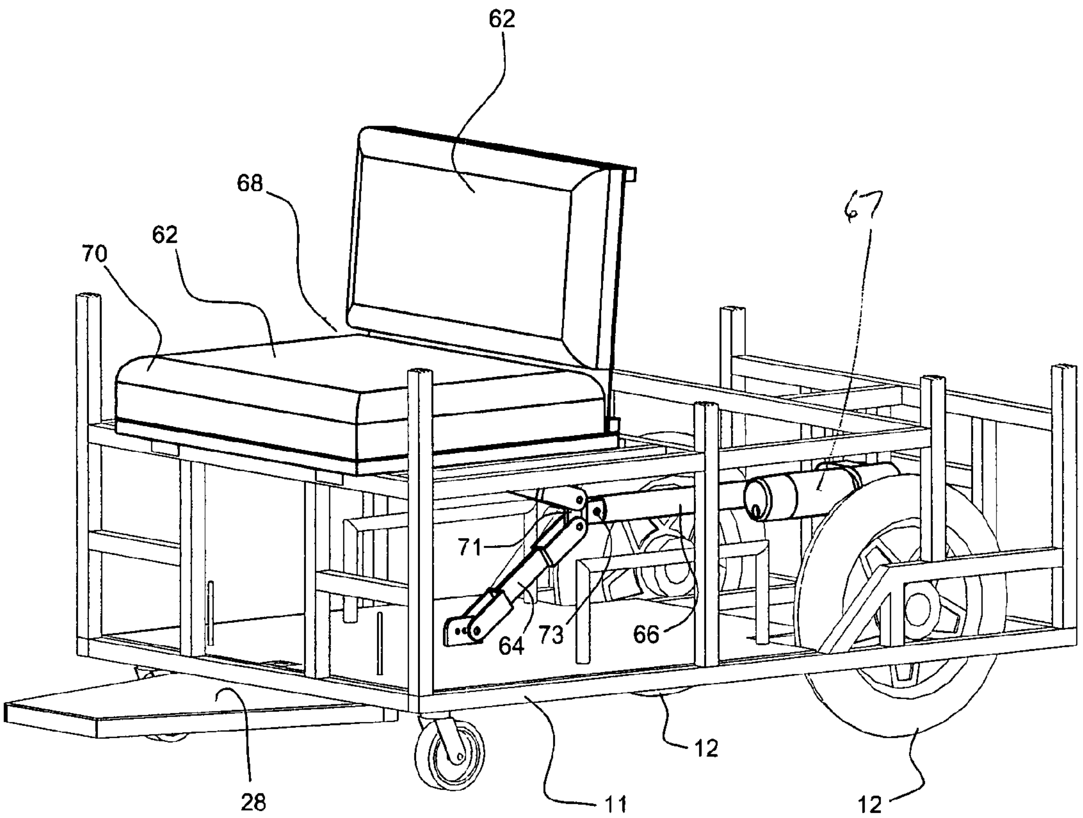
FIG. 20 is a front perspective view of the device of FIG. 1, but with a portion of the support frame member removed to reveal a linear actuator that forcibly elevates a rear portion of the seat member via pivoting bars in accordance with the present invention.
Figure 21:
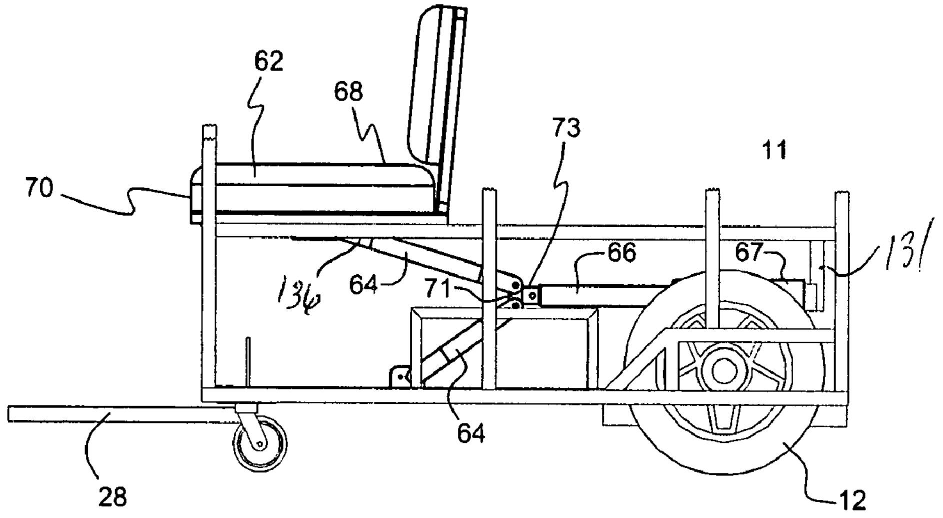
FIG. 21 is a right side elevation view of the linear actuator and pivoting bars of FIG. 20 in retracted positions in accordance with the present invention.
Figure 22:
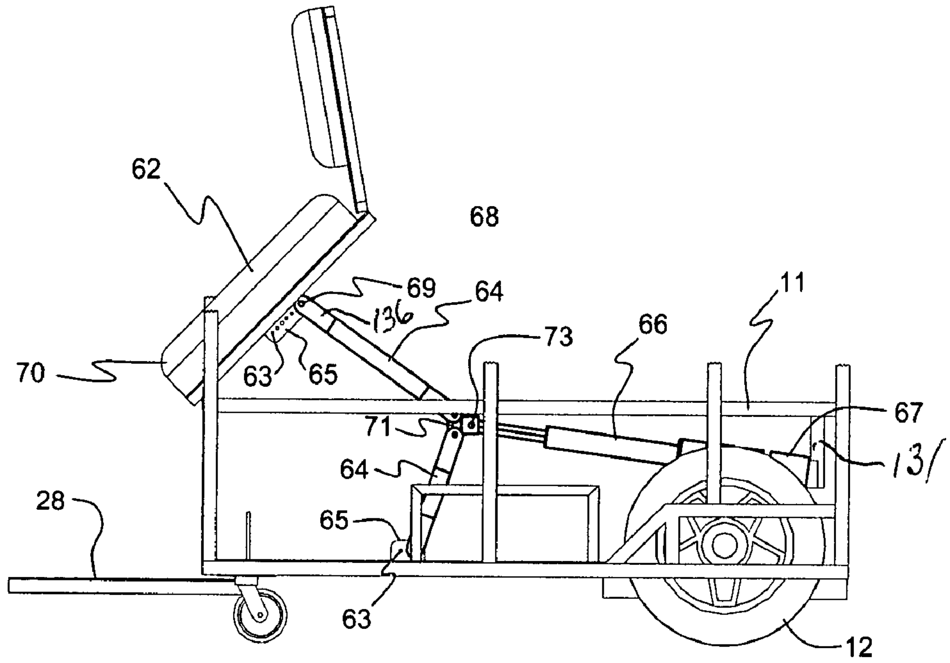
FIG. 22 is a right side elevation view of the linear actuator and pivoting bars of FIG. 20, but with the linear actuator and pivoting bars in extended positions in accordance with the present invention.
Figure 23:
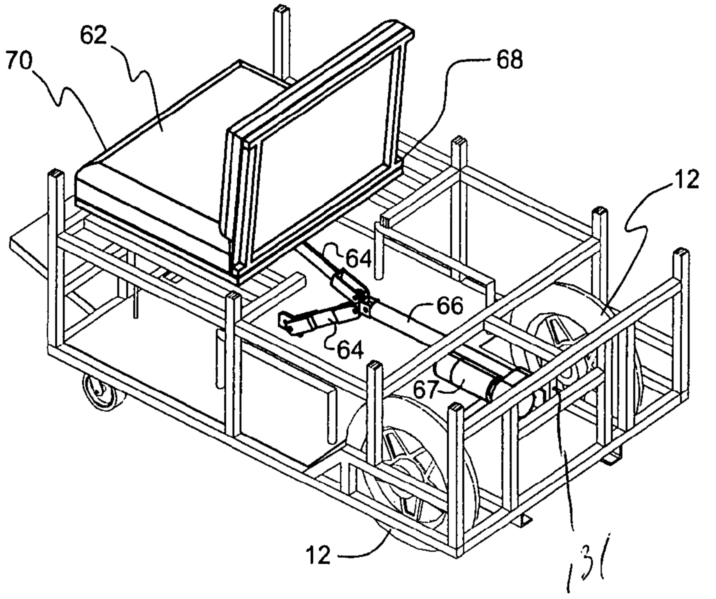
FIG. 23 is a rear perspective view of the device of FIG. 21.
Figure 24:
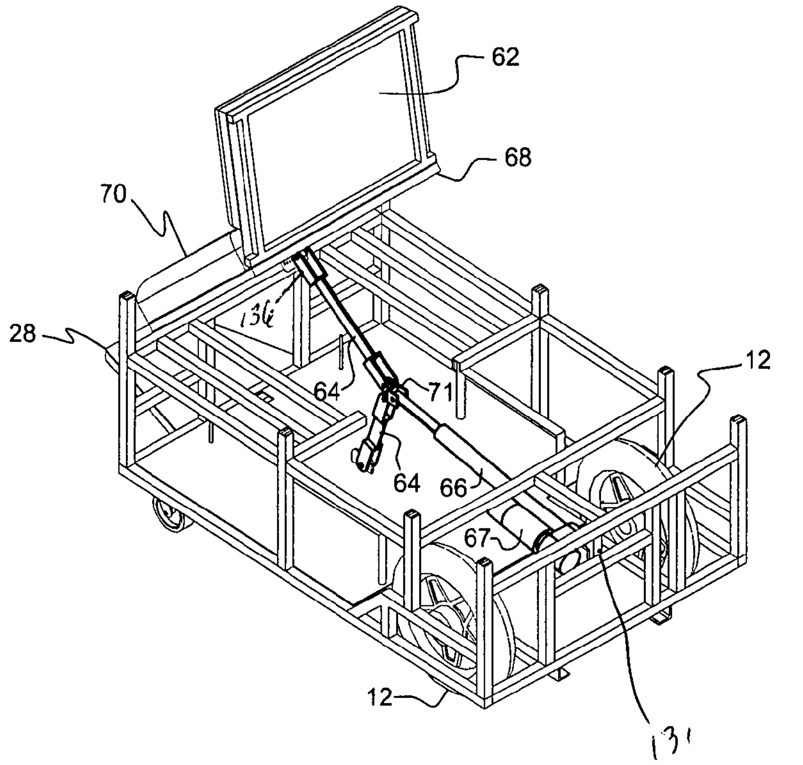
FIG. 24 is a rear perspective view of the device of FIG. 22.
Figure 25:
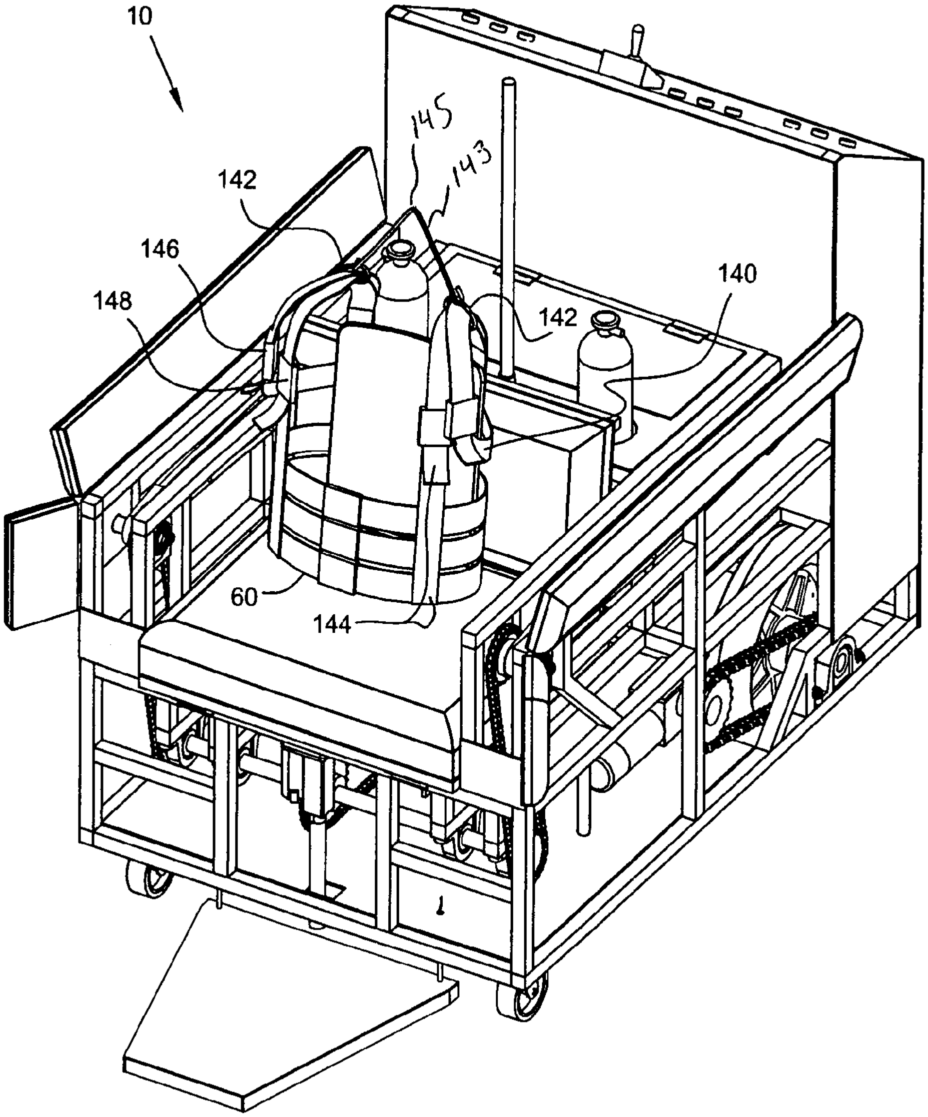
FIG. 25 is a front perspective view of the device with a lifting harness disposed upon the seat member which is in a level or retracted position, the stabilizing plate in an extended position, and the first and second lifting arms completely retracted in first and second side portions of the support frame member in accordance with the present invention.
Figure 26:
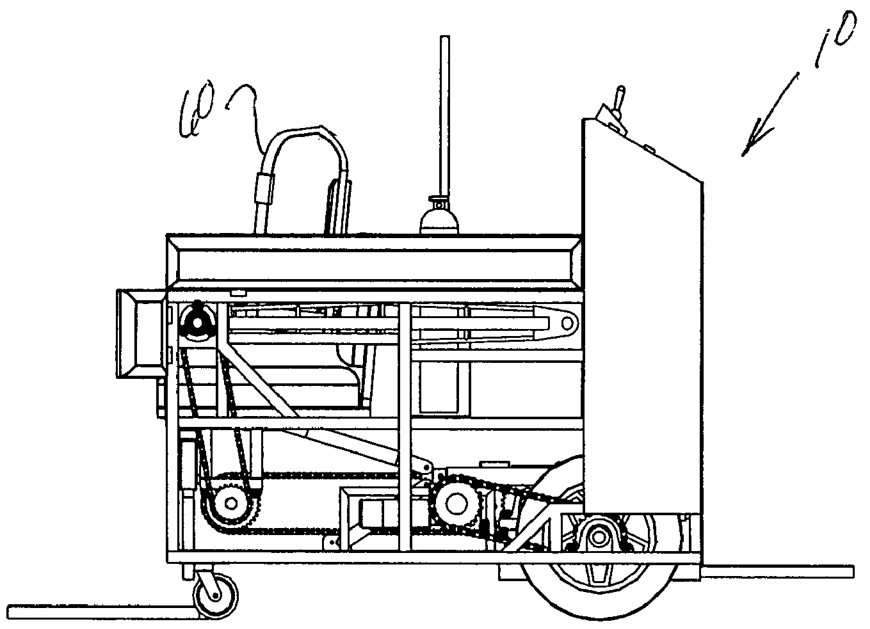
FIG. 26 is a right side elevation view of the device of FIG. 25.
Figure 27:
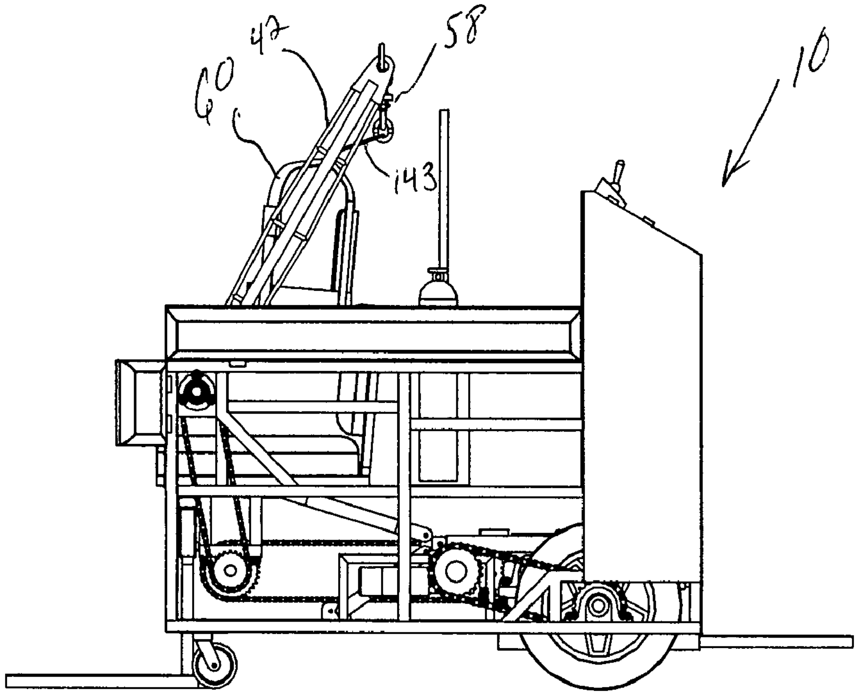
FIG. 27 is a right side elevation view of the device of FIG. 25, but with the first and second lifting arms partially extended and connected to the lifting harness in accordance with the present invention.
Figure 28:
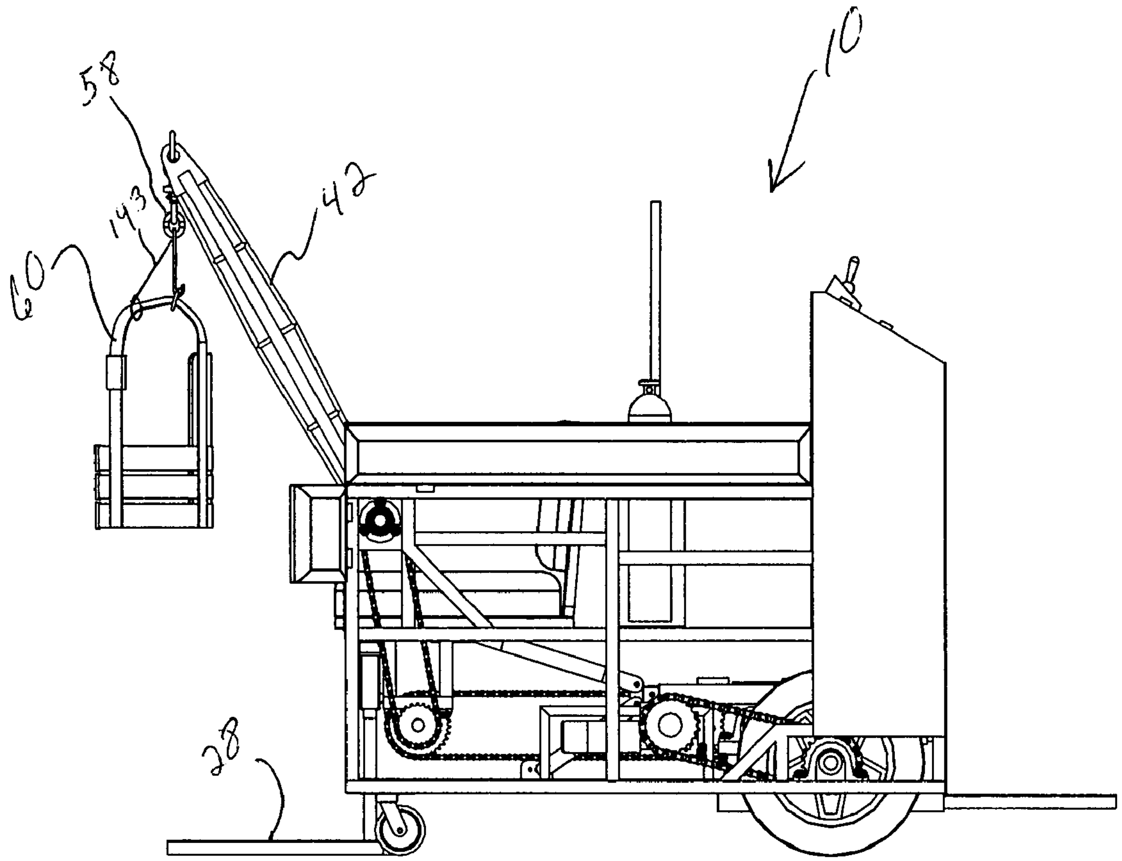
FIG. 28 is a right side elevation view of the device of FIG. 25, but with the first and second lifting arms extended further, but not completely, and supporting the lifting harness in accordance with the present invention.
Figure 29:
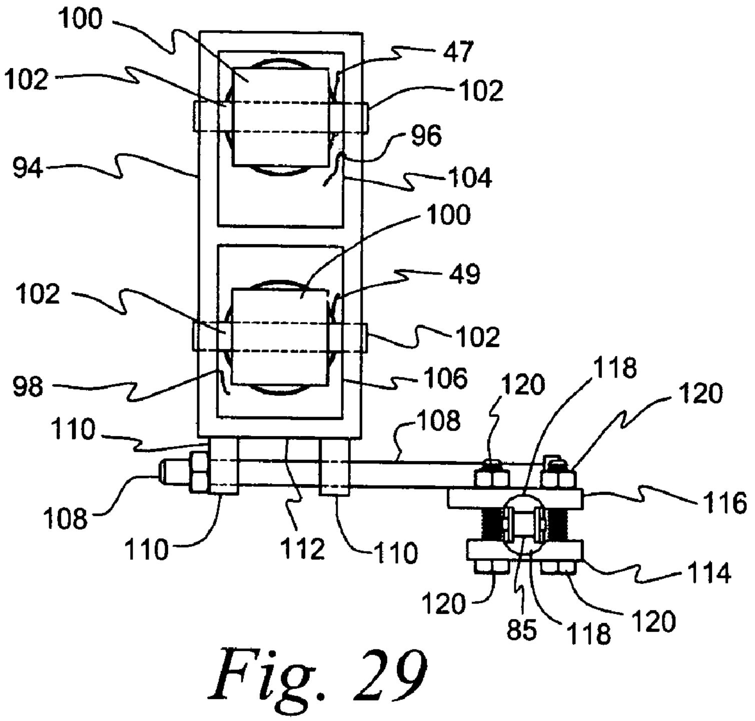
FIG. 29 is a front elevation view of a connecting bracket in accordance with the present invention.
Figure 30:
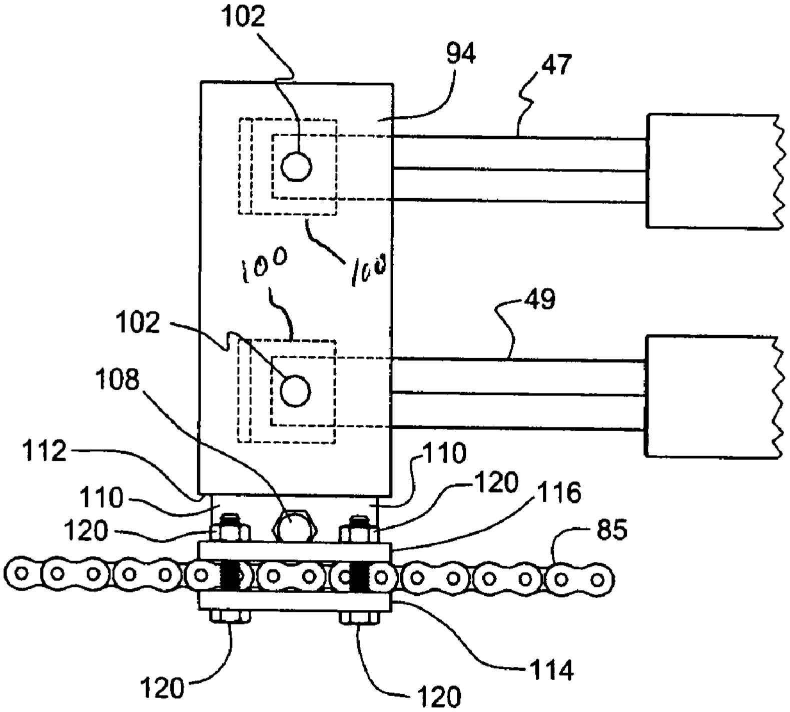
FIG. 30 is a right side elevation view of the connecting bracket of FIG. 29.
Figure 31:
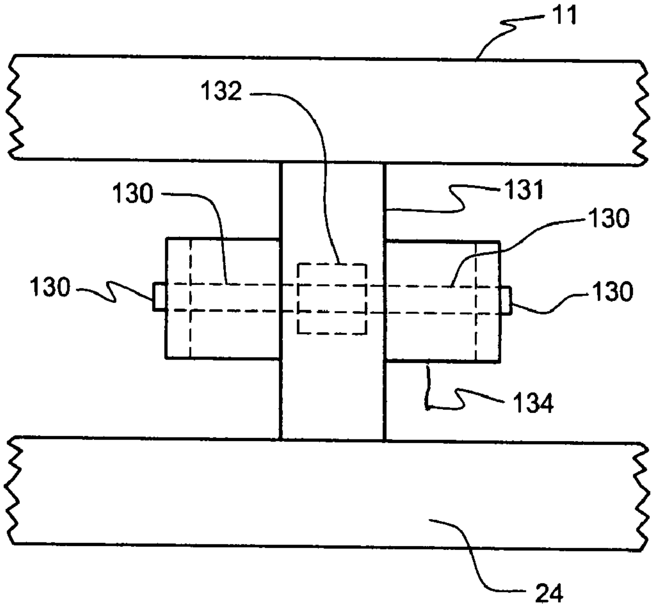
FIG. 31 is a rear elevation view of the seat member linear actuator pivotally connected to the rear portion of the support frame member in accordance with the present invention.
Figure 32:
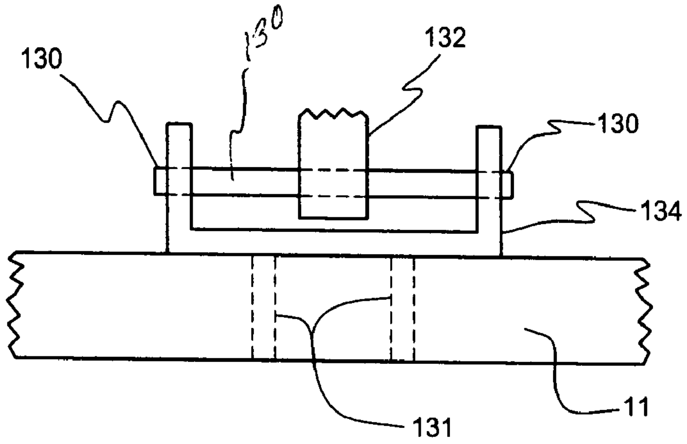
FIG. 32 is a top elevation view of the device of FIG. 31.
Figure 33:
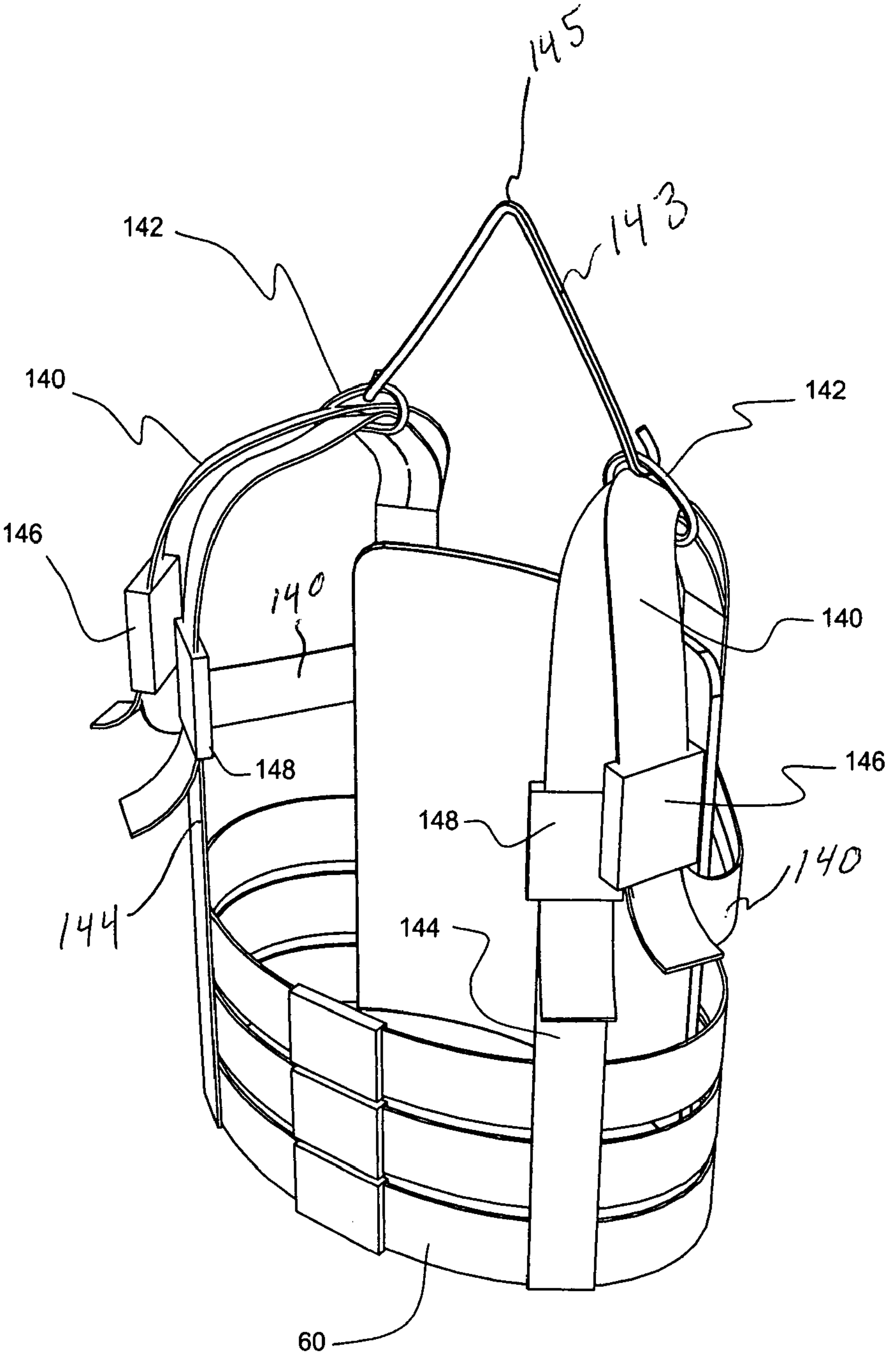
FIG. 33 is a perspective view of a lifting harness in accordance with the present invention.

Referring to FIGS. 4, 25 and 33, the harness 60 includes arm straps 140 that are adjustably secured via a clasp 146 disposed upon a front portion of the harness 60. The arm straps 140 are snugly disposed beneath the arms of a physically impaired person. The harness also includes shoulder straps 144 that are adjustably secured via a clasp 148 disposed upon a front portion of the harness 60. The shoulder straps 144 allow the impaired person to snugly disposed the straps 144 vertically across their chest. The arm and shoulder straps 140 and 144 are slidably secured together by metal rings 142 that are detachably secured to an angled rod 143 that includes an apex portion 145 which is secured to the swivel 58. The arm and shoulder straps 140 and 144, together with the metal rings and angled rod 142 and 143, cooperate to safely elevate the physically impaired person upon or from the seat member 62, via the swivel 58, without supporting the posterior of the person, thereby avoiding straps disposed about the persons legs and rear end, and simplifying the lifting procedure for the person when set upon or removed from the seat member 62.

Referring to FIGS. 1-7, and 20-24, the device 10 further includes cooperating bars 64 that are forcibly pivoted via a six hundred pound Dayton linear actuator 66 with a twelve inch stroke, which is lineally extended and retracted by the rotation of a twenty-four volt D.C. motor 67. The rotational direction of the motor 67 is controlled via three push button switches 5 (labeled "incline-stop-level") and relays (not depicted) disposed in the control panel 22. The control wiring scheme for the switches 5, relays and motor 67 is well known to those of ordinary skill in the art. The pivoting bars 64 forcibly elevate a rear portion 68 of the seat member 62 to ultimately position the seat member 62 to receive the posterior of a physically impaired person, or to promote separation of a physically impaired person from the seat member 62. The physically impaired person is assisted by a device 10 operator to stand from or sit upon the seat member 62, while the device 10 operator stands in a substantially vertical position to reduce back strain and/or back injury to the operator. Inclining the seat member 62 such that the rear portion 68 is elevated higher than a front portion 70, not only reduces the risk of back strain to an operator, but also reduces the risk of injury to the physically impaired person when being assisted upon or from the seat member 62.

Referring to FIGS. 21-24, 31 and 32, the pivoting bars 64 are detachably secured to a respective bracket 65 via a pin 69 that inserts through one of a plurality of apertures 63 in each of the brackets 65. The position of the bracket 65 and the plurality of apertures 63 allows the inclination of the seat member 62 to be adjusted to facilitate the receipt or removal of the physically impaired person upon or from the seat member 62, irrespective of the height or weight of the physically impaired person. The linear actuator 66 and motor 67 are pivotally secured to the support frame member 11 via a removable pivot pin 130 inserted through a metal extension 132 of the linear actuator 66 and a "U" clamp 134 welded to a support channel 131 of the rear portion 24 of the support frame member 11 (see FIG. 31). The pivot pin 130 and linear actuator 66 pivotally cooperate to promote the vertical elevation (up to four inches) of a linkage joint 71 rotationally joined to an end portion 73 of the linear actuator 66, the linkage joint 71 being elevated as the end portion 73 is forcibly extended by the linear actuator 66. The elevating linkage joint 71 and extending end portion 73 cooperate to forcibly urge an end portion 136 of the pivoting bar 64 joined to the seat member 62 in a direction opposite to the linear actuator 66, thereby promoting the elevation of the rear portion 68 of the seat member 62, resulting in an inclined seat member 62 that facilitates placement or removal of the physically impaired person upon or from the seat member 62.

Referring to FIG. 1, to aid the physically impaired person during transport upon the device 10, a pair of oxygen canisters 72 and a telescoping pole 74 for supporting horns, back-up alarms, strobe lights, complimentary oxygen equipment and/or plasma (not depicted) for a person being transported upon the device 10 are disposed behind the seat member 62. The positions of the canisters and pole 72 and 74 are maintained by a metal plate 76 secured to the support frame member 11. A hinged battery cover 78 is disposed adjacent to the plate 76 to cover two 12 volt D.C. auto batteries (not depicted) which provide power to the D.C. motors and the control systems operating the D.C. motors. The control panel 22 is disposed adjacent to the D.C. auto batteries and includes electrical components that comprise the control systems required to facilitate the operation of the D.C. motors.

Referring to FIGS. 2-5, 10-16, 29 and 30, the first and second lifting arms 42 and 44 are fabricated from short and long metal rods 80 and 81, and from metal flat bars 82 that are arranged to configure lifting arms 42 and 44 with sufficient length and mass to elevate a physically impaired person within a predetermined distance of the device, irrespective of the weight of the physically impaired person. A myriad of configurations may be utilized to construct the lifting arms 42 and 44, however, the preferred configuration includes a centrally disposed flat bar 82 longitudinally extending from the first and second front portions 50 and 52 to the outer ends 54 such that a planar surface 83 with a lateral dimension greater than the lateral dimension of an adjacent edge surface 87, is disposed facing a respective arm rest 41. Multiple relatively short metal rods 80 are perpendicularly welded to the edge surface 87 of the flat bars 82, and relatively long metal rods 81 are welded to the short metal rods 80, the outer ends 54 and the first and second front portions of the lifting arms 42 and 44 such that the long metal rods 81 are arcuately disposed relative to the edge surface 87 of the flat bar 82, thereby strengthening and stabilizing the flat bars 82 to promote the safe lifting of the physically impaired person.

The first and second lifting arms 42 and 44 are rotationally extended and retracted via shaft and actuator sprockets 84 and 89 cooperating with connecting chain 85. The sprockets 84 and 89, and chain 84 are rotated a quantity corresponding to the lineal travel (up to twelve inches) of a connecting bracket 94, which is coupled to end portions 100 of the first and second linear actuators 47 and 49. The shaft sprocket 84 is integrally joined to a shaft 86 that is rotationally supported by bushings 53 (the same type of bushings used with the support arms 42 and 44). The shaft 86 forcibly rotates end sprockets 88 that engage and drive corresponding end chains 90 that rotate upper sprockets 92, which rotate front portions 50 and 52 of respective lifting arms 42 and 44. The rotation of the front portions 50 and 52 dispose the outer ends 54 of the lifting arms 42 and 44 at selected positions proximate to a physically impaired person. The outer ends 54 removably receive the lifting bar 56 which removably receives the lifting harness 60 to promote the lifting of the physically impaired person.

The sprockets 84 and 89, and chain 85 are depicted as centrally disposed between the first and second side portions

46 and 48 of the support frame member 11. The central positioning of the sprocket 84 and chain 85 is preferred when the position of the seat member 62 is fixed and the linear actuator and motor 66 and 67 are removed, thereby deleting the feature of elevating the posterior of a physically impaired person via the seat member 62. However, when the seat member 62 incline feature is included, the sprocket 84 and chain 85 position must be moved closer to either of the side portions 46 and 48, thereby avoiding the seat member 62 incline components. Further, the shaft, end and upper sprockets 84, 88 and 92 are depicted with substantially equal diameters, however, increased rotational force may be required by the lifting arms 42 and 44 when lifting relatively heavy people. The rotational force to the lifting arms 42 and 44 may be increased by adjusting the diameters of the sprockets 84, 88 and 92 such that the diameter of the shaft sprocket 84 or the end sprockets 88 are relatively smaller than the diameter of the upper sprockets 92 which forcibly rotate the lifting arms 42 and 44. Thus, the rotational force imparted to the lifting arms 42 and 44 is increased, but the rotational speed of the lifting arms 42 and 44 is correspondingly decreased. Should the diameter of the shaft sprocket 84 be increased, then the diameter of the actuator sprocket 89 must be correspondingly increased to maintain the connecting chain 85 substantially parallel with the linear actuators 47 and 49 to promote the total transfer of lineal force from the actuators 47 and 49 to the chain 85 via the connecting sprocket 94. An alternative to increasing the diameters of sprockets, is to increase the number of linear actuators to a number that satisfies the lineal force required to ultimately rotate the lifting arms 42 and 44, irrespective of the weight and/or height of the physically impaired person being transported. The increased number of linear actuators would be mounted to the support frame member 11 by modifying support brackets 91, clamps 93 and the connecting bracket 94 to cooperate with the chain 85, sprocket 89 and multiple actuators to lineally transfer force from the actuators to the chain 85.

The connecting bracket 94 includes upper and lower apertures 96 and 98 that snugly receive end portions 100 of the first and second linear actuators 47 and 49. The end portions 100 are removably secured to the connecting bracket 94 via locking pins 102 that insert through aligned apertures in the end portion 100 of the first actuator 47 and side walls 104 forming the upper aperture 96 in the connecting bracket 94; and via locking pins 102 that insert through aligned apertures in the end portion 100 of the second actuator 49 and side walls 106 forming the lower aperture 98 in the connecting bracket 94. The connecting bracket 94 further includes a pivoting bolt 108 that inserts through two cooperating extensions 110 integrally joined to a bottom wall 112 of the connecting bracket 94. A lower chain plate 114 is integrally joined to an end 114 of the pivoting bolt 108. An upper chain plate 116 is ultimately bolted to the lower chain plate 114 after disposing the arm rotation chain 85 in aligned recesses 118 in each of the plates 114 and 116. Bolts 120 are inserted through the aligned plates 114 and 116 on each side of the chain 85, then tightened to a degree that binds the plates 114 and 116 to the chain 85, irrespective of the combined force generated by the first and second linear actuators 47 and 49 when rotating the lifting arms 42 and 44 while supporting a physically impaired person.

The locking pins 102 and pivoting bolt 108 are "loosely" inserted through respective receiving apertures to allow the position of the connecting bracket 94 to pivot or adjust relative to the end portions 100 when operating the first and second linear actuators 47 and 49 via the drive motors 51. Generally, the operating parameters of the drive motors 51 will vary slightly, resulting in different travel speeds for the end portions 100 of the first and second linear actuators 47 and 49. Varying the speeds of the end portions 100 when tightly joined to the connecting bracket 94, results in the first and second linear actuators 47 and 49 opposing or "fighting" each others lineal movement, thereby reducing the force imparted on the chain 85. Allowing the position of the connecting bracket 94 to adjust relative to the end portions 100 (up to one and one-half inches in the preferred embodiment) when the end portions 100 travel at different speeds, promotes cooperation between the first and second linear actuators 47 and 49, thereby increasing the force imparted on the chain 85 to a value consistent with the added load specifications of the first and second linear actuators 47 and 49.

Referring to FIGS. 25-28, and 33, in operation, the device 10 is moved or "driven" to a physically impaired person via an operator standing on the platform member 26 and directing the stick 18 in a forward direction. After positioning the device relatively close to the physically impaired person, the operator stabilizes the position of the device 10 by lowering the stabilizing plate 28 via "extend" switch 7 until the plate 28 forcibly engaging the floor 40, whereupon, the operator presses the "stop" switch 7 to stop the lowering of the plate 28. If the physically impaired person is not capable of standing, the operator then opens the hinged arm rests 41 to expose the first and second lifting arms 42 and 44. The operator then extends the arms 42 and 44 via "extend" switch 9 until the arms 42 and 44 are disposed adjacent to the physically impaired person seated upon a chair or similar support structure and facing the device 10, whereupon, the operator presses the "stop" switch 9. The physically impaired person is then secured in a lifting harness 60 via straps 140 and 144 that are cooperatively tightened about the person via respective clasps 146 and 148. A lifting bar 56 is secured to outer ends 54 of the first and second lifting arms 42 and 44 via couplers 57. The lifting bar 56 includes a swivel 58 that removably receives an angled rod 143 secured to the lifting harness 60 via rings 142. The operator then presses the "retract" switch 9 and the physically impaired person is elevated from the chair, rotated such that the person's back is toward the device 10, then lowered until their posterior end is disposed upon the seat member 62, whereupon, the "stop" switch is depressed. The stabilizing plate 28 is then retracted or raised. The operator then drives the device 10 and the seated person to a preselected destination, whereupon, the stabilizing plate 28 is again lowered and the first and second lifting arms 42 and 44 extended to a position that disposes the physically impaired person adjacent to a chair or bed. The lifting harness 60 is then rotated by the operator until the person is facing the device 10. The arms 42 and 44 are then lowered by the operator until the person's posterior engages a support structure. The lifting harness 60 is removed from the person by the operator by disconnecting the clasps 146 and 148. The operator may, but is not required to remove the harness 60 from the swivel 58. Irrespective of the harness 60 being attached to the swivel 58, the arms 42 and 44 are retracted a "safe" distance, and the device 10 is driven to a new location.

If the physically impaired person is capable of standing, the arms 42 and 44 are not extended, but the seat member 62 is adjusted. After disposing and stabilizing the device 10 adjacent to the person, the operator presses the "incline" switch 5 until a rear portion 68 of the seat member 62 is elevated to a position that inclines the seat member 62 at an angle that allows the physically impaired person to lower himself upon the seat member 62 by bending his legs. The operator then presses the "stop" button 5 and the person places their posterior upon the included seat member 62. The operator then presses the “level” button 5 which lowers the seat member 62 to a horizontal position. The operator then elevates the stabilizing plate 28 and drives the physically impaired person to a selected destination, whereupon, the device 10 is stabilized and the seat member 62 inclined to assist the physically impaired person to stand and step away from the device 10. The operator then drives the device 10 to a new location.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A device for transporting a physically impaired person comprising:

drive means for promoting manually controlled movement of a support frame member of said device;

means for stabilizing said support frame member when lifting a physically impaired person distally and horizontally separated from said support frame member, and when removing a physically impaired person from a seat member disposed upon said support frame member; and means for lifting a physically impaired person distally and horizontally separated a preselected distance from a front portion of said device, said lifting means ultimately disposing the physically impaired person upon said seat member, said lifting means being capable of removing the physically impaired person from said seat member, said lifting means including inner ends rotationally secured to said front portion of said device, said rotational inner ends being capable of positioning outer ends of said lifting means such that said lifting means form an obtuse angle with a substantially horizontal arm rest member, thereby disposing swivel means above the physically impaired person horizontally separated a preselected distance from said front portion of said device, whereby an operator of said device is capable of elevating a physically impaired person when distally and horizontally separated a preselected distance from said device then disposing the person upon said seat member of said device without securing said outer ends of said lifting means to a wall structure and without securing extension sections to said device to elevate non-retractable framework above the physically impaired person, then transporting the physically impaired person to a selected location, then elevating the physically impaired person from said seat member, and then disposing the person in a seated position upon a distal support structure separated a preselected distance from said device.

2. The device of claim 1 wherein said support frame includes means for positioning said seat member disposed upon said support frame member, said seat member ultimately being orientated to receive a physically impaired person and/or to promote separation of the physically impaired person from said seat member, whereby a physically impaired person is disposed upon or removed from said device via an operator of said device while the operator stands in a substantially vertical position, thereby reducing operator back strain.

3. The device of claim 1 wherein said drive means includes at least one electric motor that imparts rotary motion to a wheel assembly.

4. The device of claim 1 wherein said stabilizing means includes a linear actuator for imparting motion upon a stabilizing plate to forcibly urge said stabilizing plate to engage a floor surface, whereby said stabilizing plate maintains a selected position of said device relative to the floor surface, when said lifting means disposes a physically impaired person upon or removes the physically impaired person from said seat member.

5. The device of claim 1 wherein said lifting means includes opposite first and second lifting arms disposed in cooperating first and second side portions of said support frame, said first and second lifting arms being rotationally extended from respective first and second front portions of said support frame, such that outer ends of said first and second lifting arms are disposed proximate to a physically impaired person, said lifting arms are ultimately retracted to a position that prevents said lifting arms from engaging objects as the device is moving.

6. The device of claim 1 wherein said drive means is manually operated via a stick switch disposed upon a top portion of a control panel disposed upon a back portion of said support frame member.

7. The device of claim 1 wherein said support frame member includes an operator support member for allowing a device operator to ride upon the device while transporting a physically impaired person.

8. The device of claim 1 wherein said support frame member includes at least one oxygen canister with complimentary equipment to supply oxygen to a person being transported by said device.

9. The device of claim 1 wherein said drive means, stabilizing means, lifting means and positioning means are controlled and operated via a D.C. power source.

10. The device of claim 1 wherein said drive means, stabilizing means and lifting means are disposed upon a front portion of said support frame member, thereby promoting operation of said device by a physically impaired person.

11. The device of claim 2 wherein said positioning means includes a linear actuator for imparting linear motion to bars pivotally secured to said support frame and to a second side of said seat member to ultimately incline said seat member relative to said support frame such that a back portion of said seat member is elevated higher than a front portion of said seat member, thereby elevating a physically impaired person seated upon said seat member forward and distal to said support frame to promote a standing position for the physically impaired person.

12. The device of claim 4 wherein said stabilizing plate is configured and sized to extend in front of and underneath a front portion of said support frame member after said stabilizing plate engages a floor surface.

13. The device of claim 12 wherein said stabilizing plate inserts into said support frame member when transporting a physically impaired person, thereby preventing said stabilizing plate from engaging an object while said device is moving.

14. The device of claim 5 wherein said lifting means include first and second linear actuators that cooperate with corresponding first and second lifting arms to disposed said lifting arms at preselected positions.

15. The device of claim 14 wherein said lifting means include a lifting harness.

16. The device of claim 15 wherein said lifting harness includes shoulder and arms straps that cooperate to allow said lifting harness to elevate the physically impaired person from said seat member such that said lifting harness does not engage a posterior portion or legs of the physically impaired person, thereby simplifying the elevation or disposition of the physically impaired person relative to said seat member.

17. The device of claim 15 wherein said lifting harness is rotatably secured to said first and second lifting arms, whereby a physically impaired person distally disposed to said device may be lifted via said lifting means, the physically impaired person then being rotated and seated upon said seat member via rotary retraction of said first and second lifting arms, the physically impaired person ultimately being transported to a selected location, whereupon, the physically impaired person is separated from said device via said lifting arms and/or said seat member.

18. A system for lifting and moving a person comprising:

means for controlling motors for moving a chair structure;

means for lifting a person horizontally separated a preselected distance from said chair structure and disposing the person upon said chair structure, said lifting means including inner ends rotationally secured to a front portion of said chair structure and outer ends that are ultimately extended to dispose swivel means above the person horizontally separated from said chair structure such that an obtuse angle is formed between said lifting means and a substantially horizontal arm rest member, thereby horizontally separating said swivel means from said front portion of said chair structure a distance that cooperates with the horizontal distance separating the person to be lifted from said chair structure;

means for lifting the person from said chair structure and disposing the person upon a distal support frame; and means for positioning a seat member disposed upon said chair structure, whereby an operator of said chair structure is capable of elevating a seated person distally and horizontally separated a preselected distance from said chair structure, then disposing the person upon said chair structure without securing said outer ends of said lifting means to a wall structure and without securing a support structure to said chair structure such that the support structure elevates a non-retractable framework above the person.

19. The system of claim 18 wherein said chair structure includes a stabilizing member.

20. A method for transporting a person, said method comprising the steps of:

lifting a person horizontally separated a predetermined distance from a movable support structure via at least one lifting arm rotationally secured to said movable support structure, said lifting arm including an inner end rotationally secured to said movable support structure and an outer end that is ultimately extended to dispose swivel means above the person, said lifting arm ultimately forming an obtuse angle with a substantially horizontal arm rest member, thereby horizontally separating said swivel means from said movable support structure and above the person such that an operator of said movable support structure is capable of elevating the person when distally and horizontally separated from said movable support structure without securing said outer end of said lifting arm to a wall structure and without securing a non-retractable framework above the person;

disposing the person on a seat member secured to said movable support structure;

driving said movable support structure to a selected location;

lifting the person from said movable support structure; and disposing the person upon a selected support frame distal to said movable support structure.

21. The method of claim 20 wherein the step of lifting a person distal to a movable support structure includes the step of providing opposite first and second lifting arms disposed in cooperating first and second side portions of said movable support structure, said first and second lifting arms being rotationally extended from respective first and second front portions of said movable support structure, such that outer ends of said first and second lifting arms are disposed proximate to the person.

22. The method of claim 20 wherein the step of lifting a person distal to a movable support structure includes the step of providing a stabilizing member.

23. The method of claim 20 wherein the step of lifting a person distal to a movable support structure includes the step of providing an inclinable seat member for receiving a person and/or to promote separation of the person from said movable support structure.

* * * * *